US011359301B2

(12) United States Patent
Winn

(10) Patent No.: US 11,359,301 B2
(45) Date of Patent: Jun. 14, 2022

(54) TRANSPARENT AND COLORLESS HARDCOATING FILMS FOR OPTICAL MATERIALS WITH A TUNABLE INDEX OF REFRACTION AND SCRATCH RESISTANCE, AS FORMED FROM ANODIC ALUMINUM FILMS

(71) Applicant: David Roberts Winn, Westport, CT (US)

(72) Inventor: David Roberts Winn, Westport, CT (US)

( * ) Notice: Subject to any disclaimer, the term of this patent is extended or adjusted under 35 U.S.C. 154(b) by 96 days.

(21) Appl. No.: 16/262,338

(22) Filed: Jan. 30, 2019

(65) Prior Publication Data

US 2019/0226113 A1    Jul. 25, 2019

Related U.S. Application Data

(63) Continuation-in-part of application No. 15/404,873, filed on Jan. 12, 2017, now abandoned.
(Continued)

(51) Int. Cl.
*C25D 11/04* (2006.01)
*C25D 11/24* (2006.01)
(Continued)

(52) U.S. Cl.
CPC ............ *C25D 11/04* (2013.01); *C25D 11/005* (2013.01); *C25D 11/16* (2013.01); *C25D 11/246* (2013.01);
(Continued)

(58) Field of Classification Search
None
See application file for complete search history.

(56) References Cited

U.S. PATENT DOCUMENTS 3,787,298 A * 1/1974 Niebylski ................. C22C 1/08
205/50
2007/0118939 A1* 5/2007 Repetto .................. C25D 1/006
438/706

(Continued)

FOREIGN PATENT DOCUMENTS

CN           201292415      *  8/2009  ............. C25D 11/26

*Primary Examiner* — Stefanie S Wittenberg
(74) *Attorney, Agent, or Firm* — Michael A. Blake

(57) ABSTRACT

The invention relates to a method of processing of materials using a moving interface, the method comprising: providing a working material, the working material comprising a substrate with a metallic film on at least one side of the substrate; providing an energy source adjacent to the working material, where the energy source is electrical current between a cathode and the working material as an anode; providing for relative controlled movement between the working material and the energy source, where the relative controlled movement is a motor attached to the working material via a linkage; activating the energy source such that the energy processes the working material; moving the energy source and/or the working material relative to the other to control the amount of processing of the working material achieved by the energy, where the processing of the working material is anodization; immersing the working material at a controlled speed into an anodizing bath equipped with a cathode; starting anodization of the metallic film at the edge of the metallic film furthest from the anode connection and just below the anodization bath, and immersing the working material into the bath such that the anodization is moved up the metallic film towards the edge nearest the anode connection, resulting in a complete conversion to oxide, except for a non-anodized small metal or conductive edge where the anode voltage is connected to the workpiece.

24 Claims, 16 Drawing Sheets

Related U.S. Application Data

(60) Provisional application No. 62/278,104, filed on Jan. 13, 2016.

(51) Int. Cl.
*C25D 11/00* (2006.01)
*C25D 11/16* (2006.01)
*G02B 1/115* (2015.01)
*B29C 64/20* (2017.01)
*B33Y 30/00* (2015.01)

(52) U.S. Cl.
CPC .............. *B29C 64/20* (2017.08); *B33Y 30/00* (2014.12); *G02B 1/115* (2013.01); *Y02P 10/25* (2015.11)

(56) References Cited

U.S. PATENT DOCUMENTS

2013/0248373 A1\* 9/2013 Shen .................. C25D 11/022
 205/120
2014/0340912 A1\* 11/2014 Kang .................. C23C 28/00
 205/112

\* cited by examiner

TRANSPARENT AND COLORLESS HARDCOATING FILMS FOR OPTICAL MATERIALS WITH A TUNABLE INDEX OF REFRACTION AND SCRATCH RESISTANCE, AS FORMED FROM ANODIC ALUMINUM FILMS

CROSS-REFERENCES

This patent application is a continuation-in-part of U.S. patent application Ser. No. 15/404,873 by inventor David Roberts Winn entitled "MOVING INTERFACE PROCESSING OF MATERIALS," filed on Jan. 12, 2017, and which application is fully incorporated by reference herein. U.S. patent application Ser. No. 15/404,873 claims the benefit of U.S. Provisional Patent Application No. 62/278,104 by inventor David Roberts Winn entitled "MOVING INTERFACE PROCESSING OF MATERIALS," filed on Jan. 13, 2016, and which provisional application was fully incorporated by reference therein.

TECHNICAL FIELD

The present invention relates to a method of processing materials and more specifically to a moving interface processing of materials.

BACKGROUND

Below are two general examples of processing a workpiece or part to change its material properties, but that are limited to surface layers or are not able to completely convert the entire workpiece or bulk of the material to the processed material, at all, or in a timely fashion. (1.) Anodizing: The conventional anodizing by total immersion of a conducting workpiece (normally metals) connected to an anode into an anodizing fluid equipped with inert conducting cathodes (often Pb or graphite) usually produces an insulating barrier layer of the oxided (or fluorided, etc. for example, conversion of Mg to MgF2) metal workpiece that prevents anodizing the workpiece completely (that is, leaving no unoxided material), and the depth of the anodized layer is limited, leaving unanodized workpiece below the anodized layer. Normally the anodized layer, even if porous, prevents further anodization from occurring, unless new metal is exposed to the electrolyte, and a conducting connection is supplied to the remaining metal. Even in the case of porous anodization, a boundary layer of metal must be left; as the metal anodizes, the ability to conduct current is reduced to near zero, leaving metal surrounded by anodized metal. Using the standard anodizing technique, it would be impossible to anodize a metal foil or plate, or a metal film on an insulator completely—i.e. leaving no unanodized metal. For example, an aluminum film on an insulator would anodize until either islands of metal remained, or a continuous film of metal remained on the insulator. Even if a through-insulator connection to the back side of the metal were provided, isolated islands of unanodized metal would result. The bulk of the workpiece thus remains with metal, and fully or mostly opaque, even if the resulting metal oxide film is highly transparent. (2.) Soft, Gel, Liquid, Slurry and similar Materials Processing: Many plastics and other materials are processed by exposure to light (example: PMMA cross-linked by UV light), heat (example: ceramic greenforms or metallic sintering slurries), electron beams, microwaves, electric current, chemical reagent-based changes, or other energy sources/processing techniques. Generally, the energy or processing technique is exponentially absorbed from the surface of the workpiece into the bulk, producing a spatial gradient into the bulk of the cured material. If the part is thick enough or the process energy limited in time, the interior can remain unprocessed. Many material property modifications on the surface of a workpiece may also inhibit the process from proceeding fully or as rapidly into the bulk of the workpiece. For example increasing the opacity or reflectivity of an optically cross-linked plastic, or the solidification of the material can both prevent a liquid curing agent from diffusing into the bulk. In prior art anodization processes, anodic films are applied to surfaces to create colored surfaces by interference or by filling pores with colored material. However these anodization processes are known to reduce transparency and increase reflection in the anodic film.

Therefore, there is a need for a method of processing materials that overcomes the above described and other disadvantages.

SUMMARY OF THE INVENTION

The invention relates to a method of processing of materials using a moving interface, the method comprising: providing a working material, the working material comprising a substrate with a metallic film on at least one side of the substrate; providing an energy source adjacent to the working material, where the energy source is electrical current between a cathode and the working material as an anode; providing for relative controlled movement between the working material and the energy source, where the relative controlled movement is a motor attached to the working material via a linkage; activating the energy source such that the energy processes the working material; moving the energy source and/or the working material relative to the other to control the amount of processing of the working material achieved by the energy, where the processing of the working material is anodization; immersing the working material at a controlled speed into an anodizing bath equipped with a cathode; starting anodization of the metallic film at the edge of the metallic film furthest from the anode connection and just below the anodization bath, and immersing the working material into the bath such that the anodization is moved up the metallic film towards the edge nearest the anode connection, resulting in a complete conversion to oxide, except for a non-anodized small metal or conductive edge where the anode voltage is connected to the workpiece.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Figure 1:
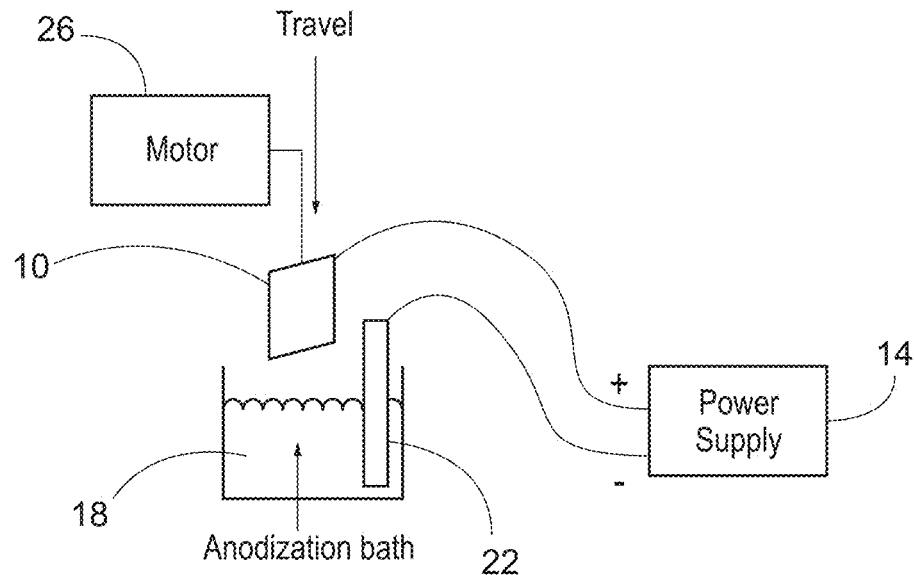
FIG. 1 is a schematic view of a moving interface processing edge anodization apparatus.

Controlled Immersion Edge Anodization—Abbreviated as Edge Anodization, EA

The EA process adapts standard anodization practice to convert any conductive material that is capable of being anodized by a fluid, gas or plasma process entirely or more completely (a much thicker layer of anodized material on the workpiece) into anodized material, in arbitrary shapes, without any remaining unanodized material, except for a vanishingly small area or strip of electrical connection to the workpiece.

MIP EA Summary:

This patent document has shown methods to anodize a metal film on an insulator of arbitrary shapes, and thin plates, sheets or fibers of metal or conductive materials completely, and is one specific realization of the more general technique of Edge Processing. The EA technique can be implemented in several ways. The method demonstrated in practice is shown schematically in FIG. 1. In this process, the conducting workpiece 10 connected to the anode programmable voltage/current supply 14 is methodically and smoothly immersed at controlled speeds into anodizing bath(s) 18 equipped with appropriate cathode(s) 22, starting at the edge of the workpiece furthest from the anode connection, and being moved methodically towards the farthest edge (the edge where the anode is connected), resulting in complete conversion to oxide, except for a vanishingly small or insignificant metal or conductive edge where the anode voltage is connected to the workpiece, that is designed to be removed or discarded at the end of the EA process. This process works on any anodizable metal/conductive/semiconductive films deposited on arbitrarily shaped substrate materials. Often the metal oxide (or fluoride, chloride, etc.) thus produced is transparent, with high mechanical hardness, or highly nanoporous, depending on anodization conditions. This method can also be used to control the currents on the sample surface by limiting the area of conductive material presented to the electrolyte in the anodization process.

MIP EA Application Summary:

The disclosed method can be used in many applications of the MIP EA process. One primary realization is to form a colorless and transparent film with low haze which may be applied to transparent substrates, but has the hardness of anodic alumina. The disclosed process maintains colorless transparency and reduces reflection. To maintain colorless film, the index of refraction of the film should be tuned to that of the underlying substrate to avoid color by interference effects. The anodic film has adjustable index of refraction by the adjustment of anodic nanoporous pore areal density, which have the index of refraction of air and thus lower the effective index of a material with pore and can be tuned further by filing the pores with other transparent materials This adjustment may be used to match the index of the substrate material, or to make a lower-index or higher index coating to control reflection, antireflection or total internal reflection, as on the cladding of an optical fiber. The pores may be filled with transparent materials for enhanced adhesion to substrates, and/or strengthening the pore walls, and/or filled with transparent materials which are hydrophobic or hydrophilic. Additionally the thickness of the anodic film can be adjusted to reduce interference effects. Such EA-applied scratch-resistant transparent films may be applied to plastic or glass glazing, windows, or lenses, either sealed, and/or filled with optical materials for haze reduction or for index of refraction matching. Low indices of refraction films can be used for optical fiber claddings or anti-reflection films, either filled/post processed, sealed, or left open.

Other applications include: a) Highly porous or nano-structured surfaces for functionalization including chemical, magnetic, electronic, optical or others, where the pores or structures must have access to and terminate on the underlying substrate. Realizations include filling the pores with scintillation or phosphor materials for ionizing radiation imaging where the underlying substrate is an imaging VLSI chip; b) Filters: nanoporous and uniform-porosity distribution; c) Z-axis Conductor/Connector on the micro-scale, where pores are filled with conducting metal, essentially nanowires in the "z-direction". The resistance parallel to the surface (x,y) is insulative because of the oxide walls, whereas the resistance perpendicular (z-direction) is typical of metals. Such a z-axis connector may be used to connect two planar microelectronic chips, or to supply power or cooling to areas of an electronic chip. d) Low dielectric constant layer substrates, near that of air, insulating, for high speed strip-lines or lowering the capacitive coupling of the lines on chips. e) Printing—inkjet printing (ink or others—deposition of small quantities in a spatial order) into the highly anisotropic pores of an anodized film makes an image without ink spreading f) Drugs or chemicals in precise dosages and as 2D arrays. g) Precise binary or more mixture precursor, where alternating pores or pore areas, or in alternating films are filled with two or more substances which subsequently are forced together to form a highly uniform compound without extensive mixing. h) Magnetic materials filled in the pores to form highly anisotropic magnetic films N-S orientations i) Hydrophilic or -phobic coatings, especially useful for hard coatings on window materials exposed to the weather or other environmental factors. j) If the anodic film is used in optical applications, the pores can be loaded with transparent, colored or opaque materials, either uniformly, or patterns to: I) reduce haze, II) adjust the index of refraction, III) create polarizing effects, IV) create dichroic filters or bandpasses; V) create optical gratings; VI) create patterned optical pathways. Materials absorbing or transmitting specified wavelengths of light can be used in the pores for filters or other optical effects. Highly absorbing films deposited on the walls of the pores create a material that passes light over a narrow range of angles of incidence, the maximum angle θ to the surface being given approximately by $\sin \theta \sim$ (pore diameter/pore length).

The disclosed method can be used to anodize many conductive materials (normally metals) completely (that is, no remaining unanodized material in the workpiece), or with greater anodized layer thicknesses, than those obtained with standard anodizing, by controlled edge immersion into anodizing cells. In this method the workpiece is methodically immersed at controlled speeds into anodizing baths, starting at the edge of the workpiece furthest from the anode connection, resulting in complete conversion to oxide (or fluoride, etc.), except for a vanishingly small or insignificant Edge where the anode voltage is connected to the workpiece. This controlled immersion process also works on any anodizable metal/conductive films deposited on arbitrarily shaped substrate materials (normally substrates unaffected by the anodization process), wherein the deposited metal or semimetal film is anodized completely or more completely, with no or little remaining unanodized material remaining on the substrate except for a connection strip to the anode. Often the metal oxide (or fluoride, chloride, etc.) thus produced is transparent, with high mechanical hardness, and highly nanoporous, depending on the anodization conditions (chemistry, voltage, temperature). A thin metal piece (i.e. foils or sheets) or a metal film on an insulator, such as plastic or glass, is mounted on a motorized stage, which allows the sample to be lowered into the anodization bath at a controlled velocity. The key idea is that the section of the piece just above the anodization bath acts as the anode terminal connection, an edge connection equal at all parts of the cross-section through the thickness of the aluminum piece. As the piece is "adiabatically" lowered into the bath, in effect the anode terminal is presented equally to all parts of the unanodized metal in the bath, unlike the situation if the anodization starts on a fully immersed film, where metal not in direct contact with the electrolyte becomes insulated by the barrier oxide formed on the metal surrounding it. Only the thin strip of (semi-)metal which is just below the bath surface is unanodized, but connected to the same potential. The entire metal is thus able to be anodized as the metal is immersed methodically into the electrolyte. We call this the Edge Anodization technique, and it is shown schematically in FIG. 1.

FIG. 1 is a schematic view of the MIP EA technique where aluminum pieces 10 are controllably submerged into the anodization bath 18, typically by a stepper motor 26. The cathode connection to the electrolyte (anodization bath) is represented by the thick electrode 22, which may be a lead or carbon sheet.

The key technical and scientific challenge is to provide control of the insertion motion and direction to anodize the film with uniform quality. This motion can be controlled with feedback on the anodization current or current density.

There are several constraints on the sample velocity. If the velocity is set too high, then the cell current/voltage (I/V) characteristic will be dominated by the current drawn as the virgin metal surface develops its oxide barrier. In the limiting case of high velocity, it is the same as anodizing the entire surface at once. If the velocity is too low, then the quality of the metal surface and the electrolyte/metal interface will determine the quality of the anodized film. Extremely low velocities and unclean surfaces could lead to unanodized areas of the aluminum surface. Typical velocities are ~0.1-1 mm/s. Larger or smaller velocities are possible depending on the processing protocol, Al thickness, or the desired pore sizes.

Figure 2:
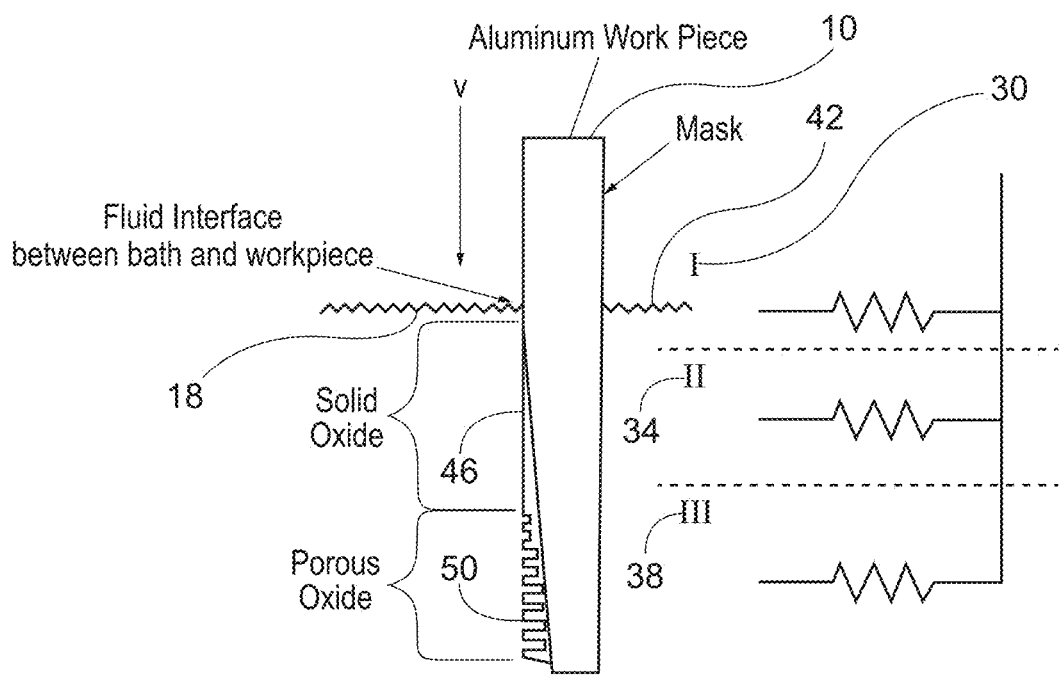
FIG. 2 is a schematic view of anodization cell resistance.

FIG. 2 is a schematic illustration of anodization cell resistance. Note the three distinct regions 30, 34, 38 on the sample representing the three stages of anodization. The physics behind the new MIP Edge Anodization technique (EA) is shown in FIG. 2. As the aluminum piece (either as an applied film on a substrate or free-standing Al pieces) 10 is lowered into the bath 18, the resistance may be modeled as a parallel network of resistors. There are three distinct regions in the bath that characterize the resistor network. The first region 30 is near the bath surface 42. This region will have the lowest resistance because new aluminum surface is constantly being introduced into the electrolyte. In fact, the only appreciable resistance presented by this region is the resistance of the native oxide present on the aluminum surface. The second region 34 lies below the bath surface 42 where the initial solid "oxide" (for example $Al_2O_3$) barrier layer 46 has formed. This region will present the highest resistance in the cell for the thin layer anodization because this is where the low conductance oxide is thickest. The third region 38 is the porous alumina region which will have a resistance intermediate to the top two regions because the barrier oxide 50 at the bottom of the pores is thinner than the oxide in the second region. As the sample is lowered into the bath the size of the first region 30 will remain unchanged. The velocity of the sample entry will determine the size of the other two regions 34, 38. Higher velocities will allow the solid barrier region 46 to be larger since we have determined that a finite time is required for the initial oxide barrier to reach its maximum thickness. The higher the initial velocity of the sample, the larger this region will become because more of the sample will be introduced during the period of time required for the barrier to reach maximum thickness. Conversely, lower velocities will result in a smaller solid barrier region 46.

To first order, the size of the porous region 50 will depend on the overall size of the area to be anodized. Large area samples will inevitably have a porous region develop near the leading edge of the sample first introduced into the bath. The area of this region is also dependent on the sample velocity v to second order, since the area of this region (width w) is the area of the entire submerged portion of the sample $A_{submerged}$ (=vtw) less the first and second regions. That is, the porous area $A_{porous}$ for long times t:

$$A_{porous} = A_{submerged} - A_{interface} - A_{barrier} \quad (1)$$

or, by substituting the size A of the other regions $$A_{porous} = vtw - vt_{req}w - A_{barrier} \quad (2)$$

where v is the velocity, w is the sample width at the electrolyte surface, and $t_{req}$ is the time required for the initial oxide (or fluoride, etc.) barrier area $A_{barrier}$ to reach its maximum thickness.

Anodization chemistry is commonly available for Al, Ti, Mg, Ni, Zr, and Zn, with Fe alloys less commonly used (black ferric oxide). Many standard anodization methods are described in ASTM standards. Fluoriding and similar chemistry beyond oxiding are also applicable to Edge Anodization. Titanium (oxide), Aluminum (oxide) and Magnesium (fluoride) Edge Anodization are particularly useful applications.

MIP Edge Anodization (EA) of Aluminum will be discussed further below. A pure Al foil can be entirely anodized into a form of transparent alumina. An Al film deposited on a non-conducting substrate, such as glass or plastic, can be entirely anodized into a transparent, hard, highly scratch resistant form of aluminum-oxide, capable of being fabricated as largely porous, with a monotonous array of nano pores and porosities that may exceed 65%. FIGS. 10-14 show the nanoporous film properties of EA processed Aluminum. FIGS. 15-18 show photographs of the Edge Anodized pieces of deposited films, and of a common kitchen Al foil. These nanopores can be widened, sealed, and/or filled with other materials to enhance its properties for desired characteristics, for example for moisture sealing of the anodized film as a scratch-resistant plastic or glass. When the alumina pores are full of air or other low index materials, alumina nanoporous films may have an effective index of refraction n given by the combined averaged indices of the alumina and material in the pore. In the case of air, the effect index may be lower than that of any common solid optical fiber cladding film, approaching n=1.1 or even less, and adjustable up to or exceeding that of sapphire with appropriate loading of the nanopores with materials with higher or lower indices than that of the alumina.

Figure 3:
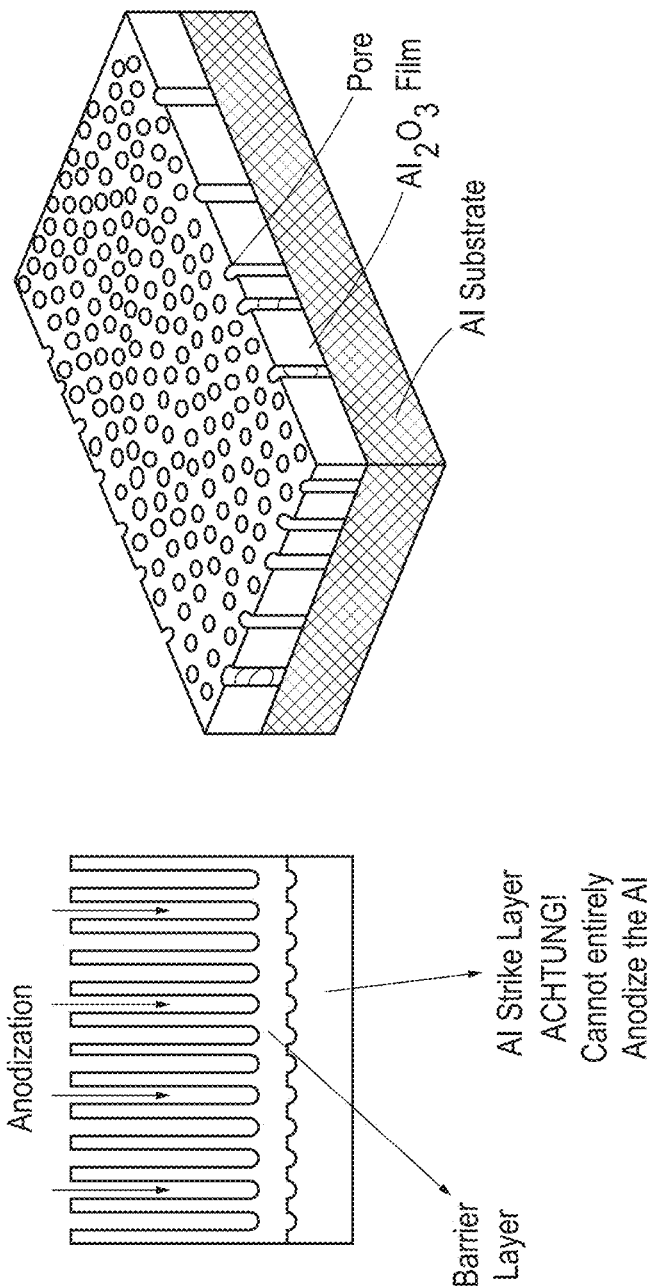
FIG. 3 is a schematic view of an anodization process.

Below is discussed anodized aluminum and the formation of alumina and sapphire-like films. The anodization of aluminum is a large subject, however, in general, aluminum anodizes to form a porous film of amorphous (non-crystalline) phases alumina (boehmite, γ-alumina—$Al_2O_3$) on the aluminum. The film is composed of essentially the same materials-base as sapphire and alumina ceramics. These materials are among the most intrinsically hard known, and are also transparent. Remarkably, the size of the resulting porous structure is essentially unchanged from the parent aluminum. Aluminum is not removed—the incorporation of oxygen during anodization produces a molecular structure smaller than the original aluminum, thereby providing the driving mechanism to create pores in the anodized aluminum. Microporous alumina ($Al_2O_3$) thin sheets or films exhibit a highly anisotropic and uniform pore structure consisting of channels perpendicular to the film surface, whose size and spatial distribution can be controlled by changes in the anodization process parameters The channel position is quasi-regular, on a quasi-regular hexagonal matrix. The areal density, size and regularity of these pores is controllable over a remarkably wide range with the electrolyte chemistry, temperature, current density, and the electric field during the anodization. The pores typically range in size from about 5 nm to about 200 nm in size, and vary in areal open pore density from about <1% of the alumina surface up to about 65%. The pores terminate in a non-porous thin boundary layer of alumina at the aluminum alumina interface, the thickness of which is also determined by the anodization conditions. These porous structures have wide application in technology (filters for example), and are the basis of colored anodized aluminum by incorporation of dyes into the pores. The remaining underlying Al metal of must be mechanically or chemically removed depending on the application. FIG. 3 shows a schematic of the standard anodization process, as it will also be applied to Edge Anodization as in FIGS. 1, 2.

FIGS. 1 and 2 show the Edge Anodization method for how to move the strike-layer from the whole Al surface to one edge, so that the entire Al remains connected except for a thin stripe or area at one edge of the work piece when the process terminates.

As shown in FIG. 3, when aluminum is anodically oxidized in an acidic electrolyte, a uniform and oriented porous structure may be formed with nearly parallel pores organized in a hexagonal geometry. By adjusting the anodization voltage, electrolyte composition, and concentration, one can accurately control the diameter and center-to-center spacing of the pores. A post-anodization pore widening step using phosphoric acid allows further control of the pore diameter. With respect to the Al strike layer, the aluminum cannot be entirely anodized if the work piece is wholly immersed at the start. If wholly immersed at the start, then an opaque aluminum layer will be left.

Figures 4, 5:
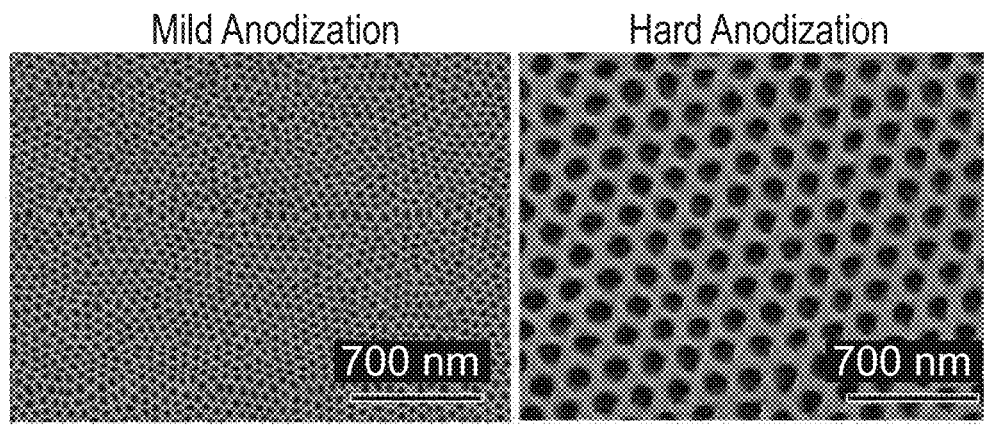
FIG. 4 is a scanning electron microscope image showing thin porous anodic alumina film, 700 nm, film thickness of 3.8 μm.
FIG. 5 is a scanning electron microscope image showing thin porous anodic alumina film, 700 nm, film thickness of 3.8 μm.
Figures 6, 7:
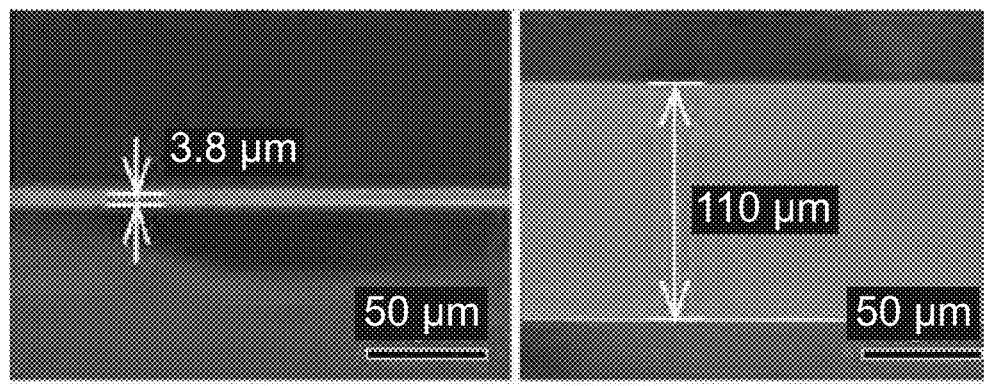
FIG. 6 is a scanning electron microscope image showing thin porous anodic alumina film, 700 nm, film thickness of 110 µm.
FIG. 7 is a scanning electron microscope image showing thin porous anodic alumina film, 700 nm, film thickness of 110 µm.
Figure 8:
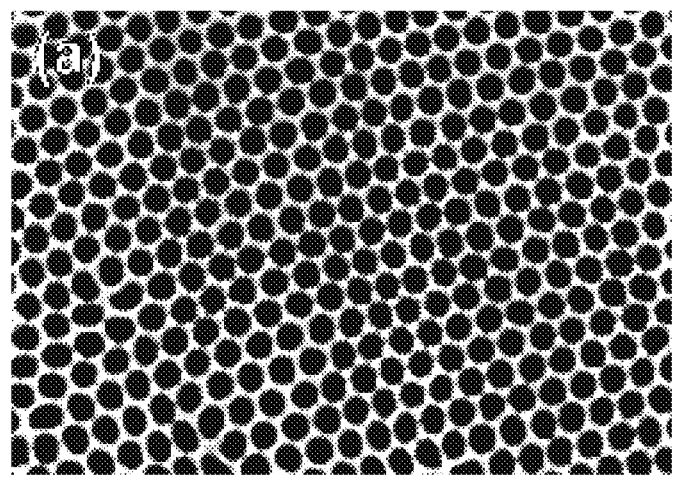
FIG. 8 is a scanning electron microscope image showing thin porous anodic alumina film and the high density of pores possible.
Figure 9:
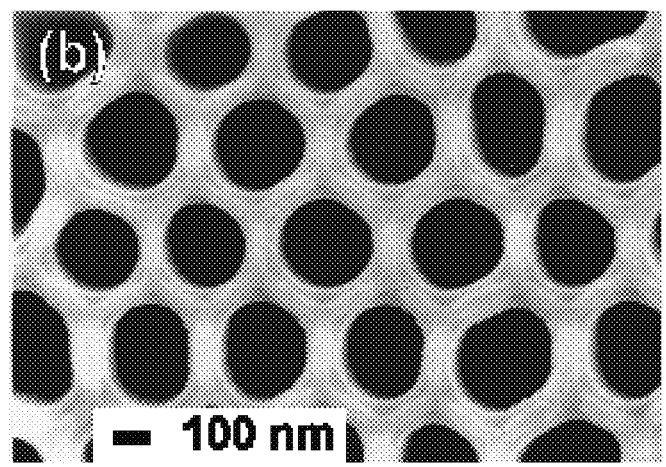
FIG. 9 is a scanning electron microscope image showing thin porous anodic alumina film and the results of pore-widening in Aluminum to alumina anodization using standard techniques.

FIG. 9 shows SEM images from the literature showing the variation in pores by variations in standard prior art Al anodizing process parameters. FIG. 4 shows a thin porous anodic alumina films with self-ordered cylindrical vertical pores in aluminum films deposited on a substrate, Note the film thicknesses; FIG. 8 shows the high density of pores possible; FIG. 9 shows the results of pore-widening in Aluminum to alumina anodization using standard techniques.

All these films result in a barrier layer and opaque strike layer left behind as in FIG. 3. These pores can be extended so that no strike or barrier layer remains, using Edge Anodization process.

In some embodiments, MIP EA technique can be used to obtain complete anodization of aluminum on glass or lucite, with sputtered Al and with evaporated aluminum films, varying from about 0.5 to about 4 μm thick, roughly following the schematic of FIGS. 1, 2. A fast-responding linear stepper motor was programmed with step size of 50-100 nm and step period/rep rate to achieve speeds of 0.1-1 mm/s to insert the slide into an anodization bath, starting from the bottom, and a programmable power supply was programmed with a current profile. In some embodiments, the step speed varied between 0.1-0.3 mm/s.

In some embodiments, the MIP Edge Anodization electrolytes for Al were aqueous solutions of sulfuric, chromic, phosphoric or oxalic acid (typically about 1% to about 30%). In some embodiments, solutions were used of phosphoric, sulfuric and oxalic acids at concentrations of about 2% to about 20%. In some embodiments, typical cell voltages ranged from about ±10 to about ±150 volts. Typical stepper profiles ranged between about 0.1 to about 0.5 mm/s. Anodization cells consisted of a pair of about 5 cm×about 5 cm×about 1 cm thick graphite or lead cathode electrodes connected by teflon or poly insulated wire, immersed in teflon or polyethylene or other containers resistant to the anodizing acids. Sets of anodizing cell containers were maintained to avoid contamination amongst electrolytes. The graphite and lead electrodes were obtained with highly polished surfaces (stainless steel is also appropriate). The leads were attached in blind holes with silver paint and protected with fluorocarbon grommets. A set of gauge blocks of machined plastics maintained the cell electrodes highly parallel. Electrode separations were adjustable from about 0.5 mm to about 1 cm. The power supplies operated either under constant current and constant voltage regulation using a highly regulated power supply with a voltage range from about ±0 to about ±300 Volts which can supply up to about 10 A. The temperature was controlled and measured to about ±0.5 C, over a range from about 0° to about 80° C. The films and foils were chemically etched, rinsed and briefly vacuum dried at moderate temperatures before anodizing. Samples of the pores produced are shown in FIGS. 10 and 11 below.

Figure 11:
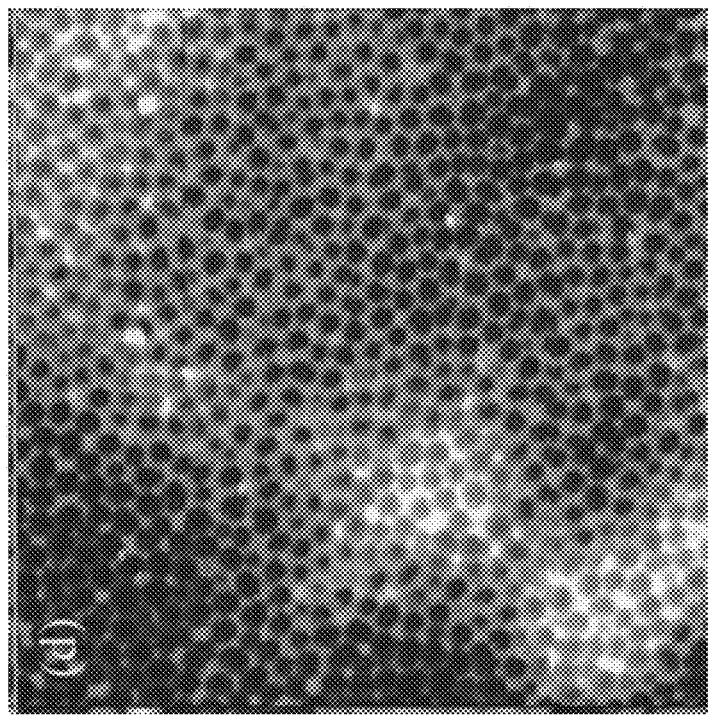
FIG. 11 is a scanning electronic microscope images showing anodic alumina, and a 2 µm×2 µm square SEM field formed under different anodizing conditions.
Figure 10:
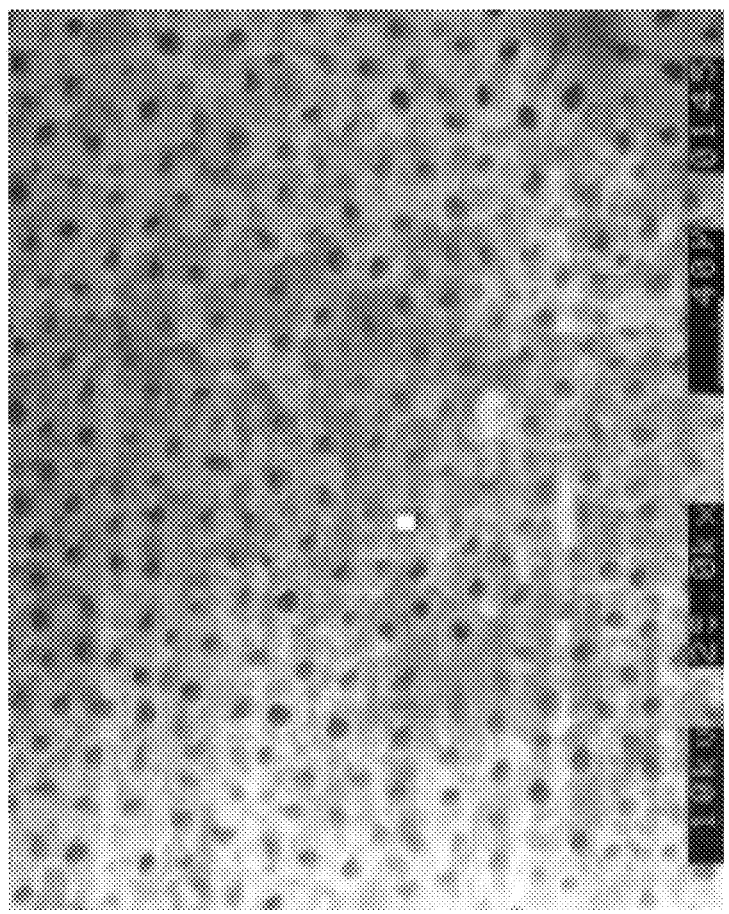
FIG. 10 is a scanning electronic microscope images showing anodic alumina, the film is produced from Al film on glass, before pore-widening.

FIGS. 10 and 11 are figures showing the scanning electron microscope (SEM) micrographs of Anodic alumina formed by MIP Edge Anodization. FIG. 10 is a film produced from Al film on glass, before pore-widening. With respect to FIG. 10, the fiducial is about 400 nm and the pores are about 50-100 nm. FIG. 11 is a 2 μm×2 μm square SEM field formed under different anodizing conditions. The pores are ~50 nm, <optical wavelengths. These films were transparent, with no strike layer left.

A study was performed on the MIP Edge Anodization of aluminum to optimize the anodization conditions needed to produce a matrix of uniformly sized and spaced pores. The effects of varying anodization voltage, temperature, time, electrode geometry, and the composition of the anodization bath were examined. Samples were anodized using a DC current and a nickel mesh as the cathode material with 3" or 10" spacings. The DC anodization voltage was varied from 20 to 200 volts and anodization times ranged from 5 minutes to 4 hours. Electrolytic solutions of 0.5, 0.3, and 0.05 weight percent oxalic acid and 0.3-weight percent phosphoric acid were used in the anodization baths, which were typically kept at 5° C. After anodizing, many samples were pore widened in 0.5 weight percent phosphoric acid at 37° C. Almost all of the samples were oxidized in air at 150° C. for 30 minutes prior to anodization.

Using SEM and photomicrographic data, and different deposited Al film starting thickness, it was confirmed that the pore depth for the edge anodization is a direct function of edge anodization time, as it is for standard Al anodization. The size and spacing of the channels are very uniformly distributed, and they form a closed packed hexagonal array of columnar cells.

Figure 12:
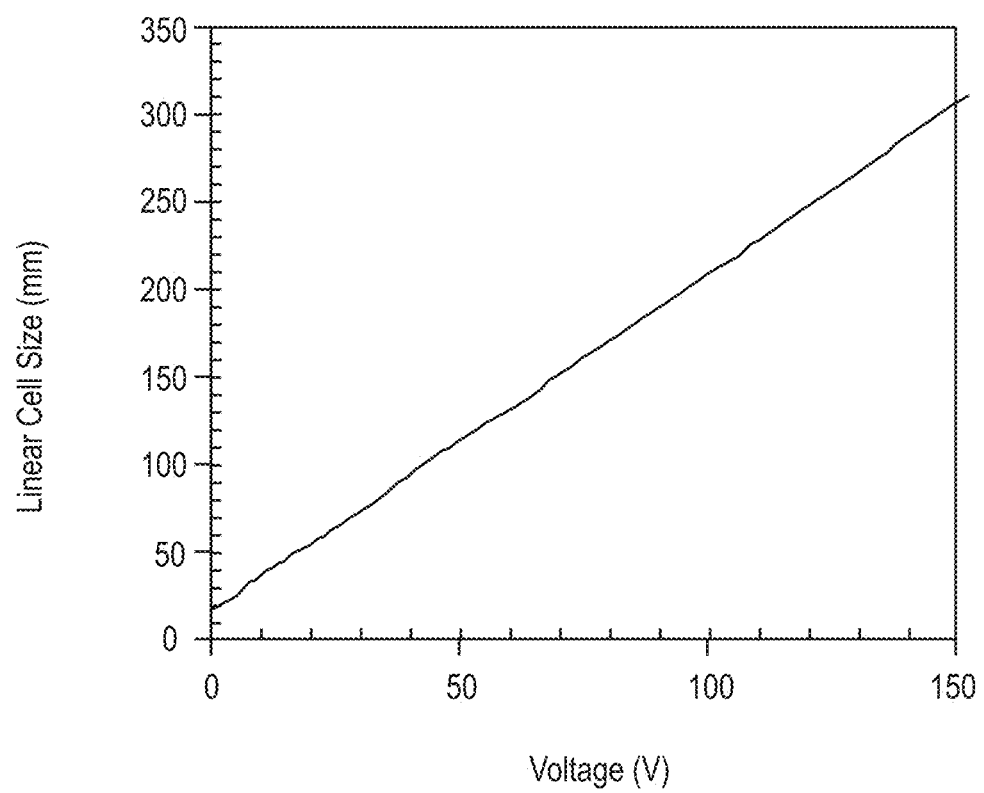
FIG. 12 is a plot showing the dependence of the pore size on anodization voltage.

FIG. 12 is a plot showing the dependence of the pore size on anodization voltage using a 2 wt. % oxalic acid electrolyte. A typical fit to the dependence of anodic alumina pore cell diameter on anodization voltage under the same chemistry and temperature obtained in our studies.

It was determined that the pore diameter and center-to-center spacing were close to independent of anodization time. The anodization time does, however, determine the depth of the pores directly. The pore size and spacing are a function of voltage, with the diameter also depending on whether the pores were widened in phosphoric acid, or other etchants, or not. FIGS. 10, 11, 12 show the voltage dependence of the pore diameter and spacing, respectively. The data are both fairly linear, with some of the spread being attributed to not distinguishing between the 3" electrode spacing, the 10" electrode spacing. Linear best fits are presented for FIGS. 13 and 14, respectively, showing a dependence of the pore size d, $d \propto 0.5\ V_A$, and pore spacing s, $s \propto V_A$, where $V_A$ is the anodization voltage, and d and s are in nm.

Figure 13:
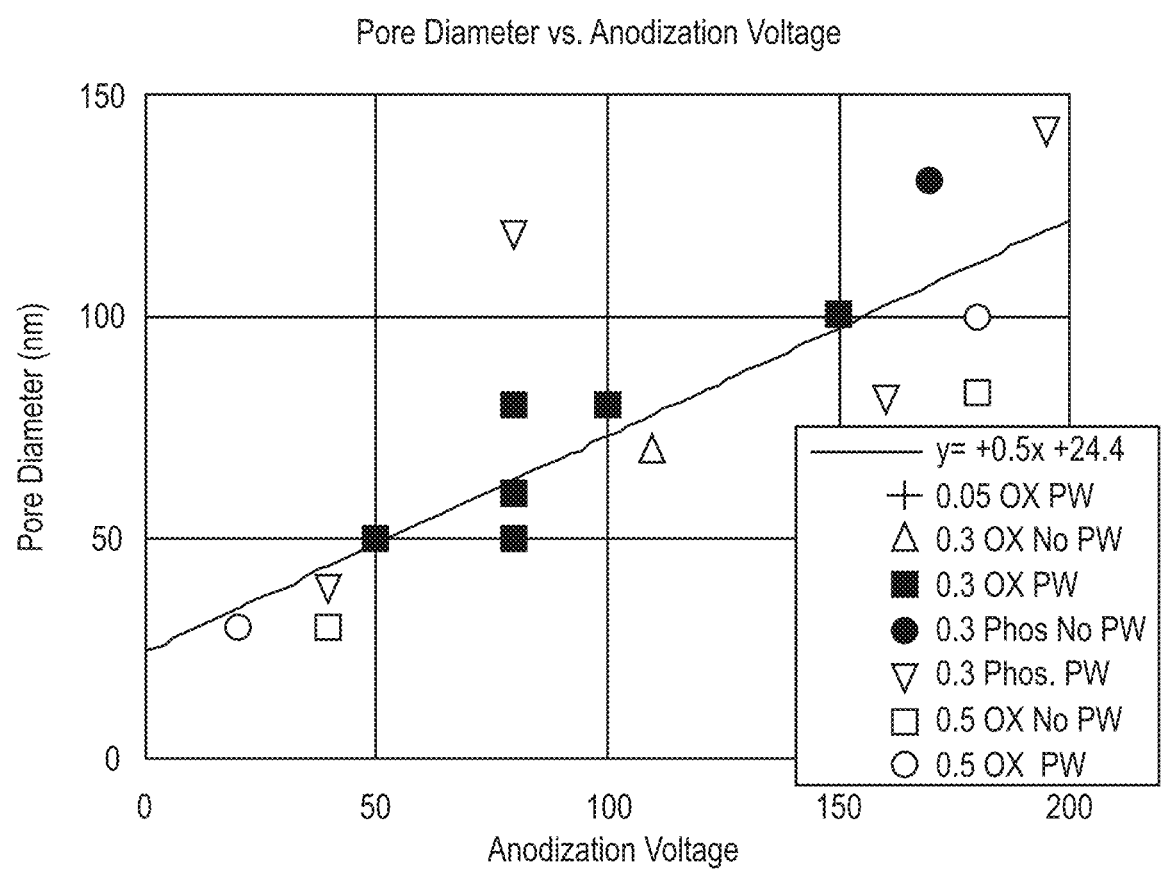
FIG. 13 is a plot that shows the pore diameter as a function of anodization voltage for the samples studied.

FIG. 13 is a plot that shows the pore diameter as a function of anodization voltage for the samples studied. The data has been sorted according to electrolyte (OX=Oxalic Acid; Phos.=Phosphoric Acid), weight percent, and pore widening (PW). The data is roughly linear with a little spread, because this plot does not distinguish data taken at a 3" electrode distance, or 10" spacing.

Figure 14:
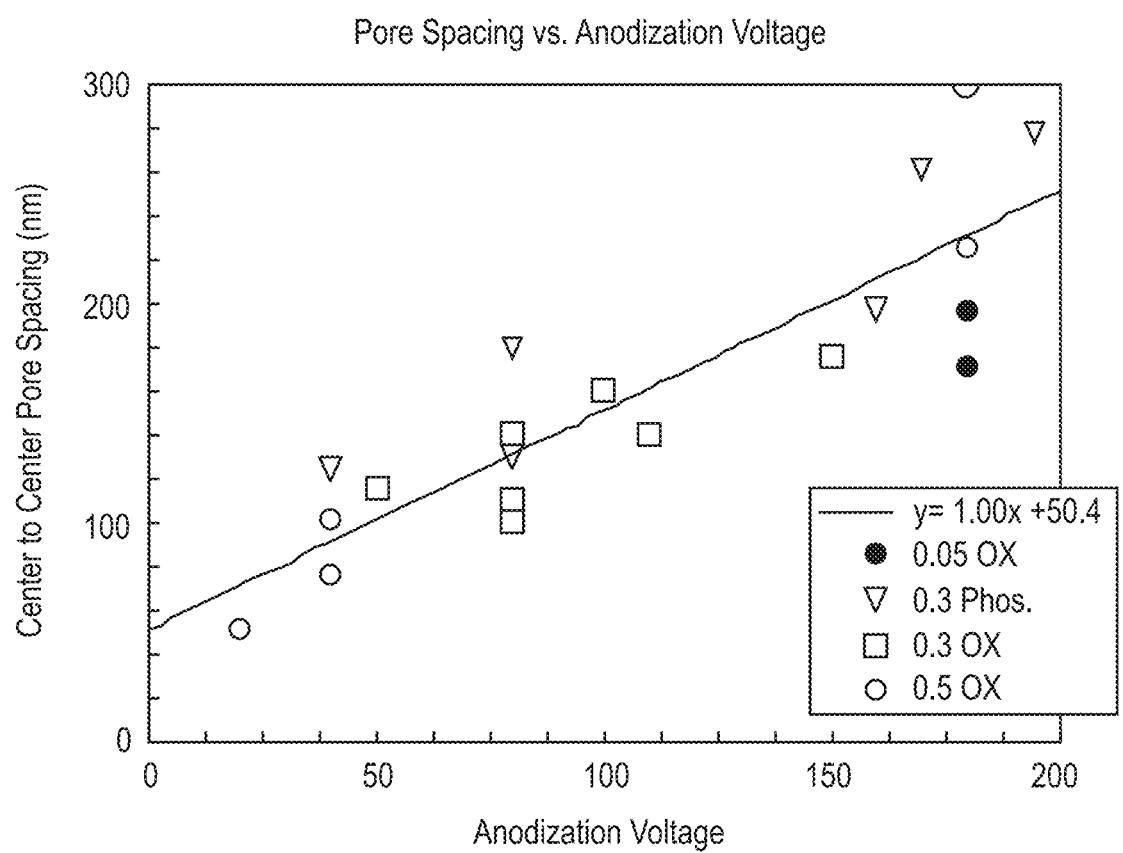
FIG. 14 is a plot that shows the center-to-center pore spacing as a function of anodization voltage for the samples studied.

FIG. 14 is a plot that shows the center-to-center pore spacing as a function of anodization voltage for the samples studied. The data is roughly linear with a little spread. Pore widening does not affect pore spacing.

Figure 17:
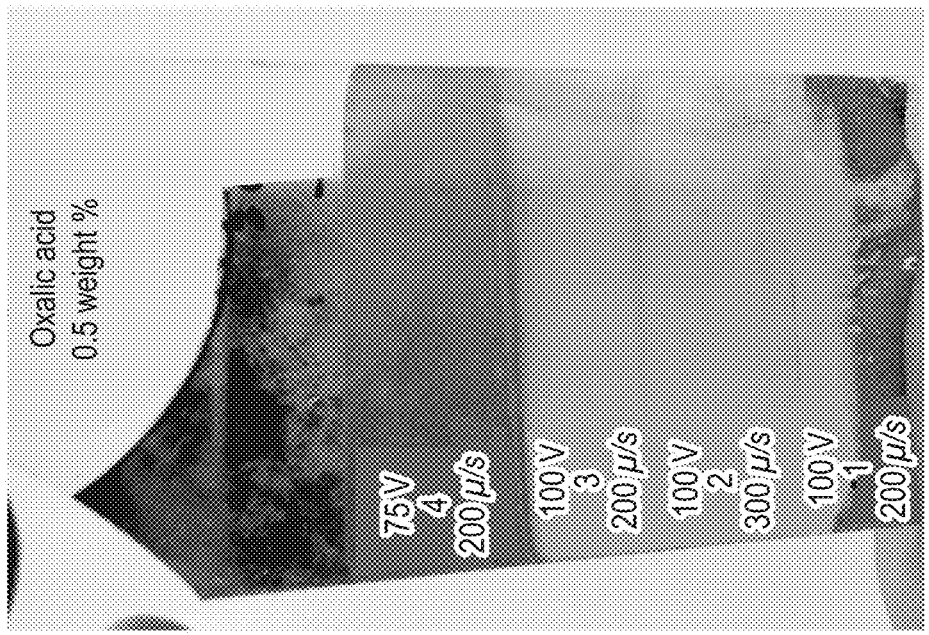
FIG. 17 is an image of a normally illuminated glass slide with 4 edge anodizations.
Figure 16:
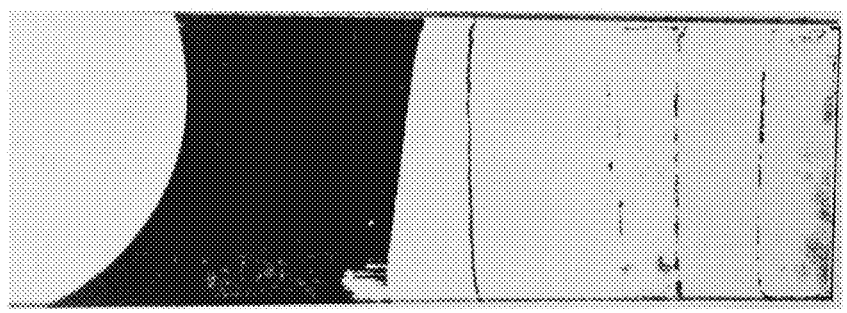
FIG. 16 is an image showing shows the results of refined programming of the EA rig.
Figure 15:
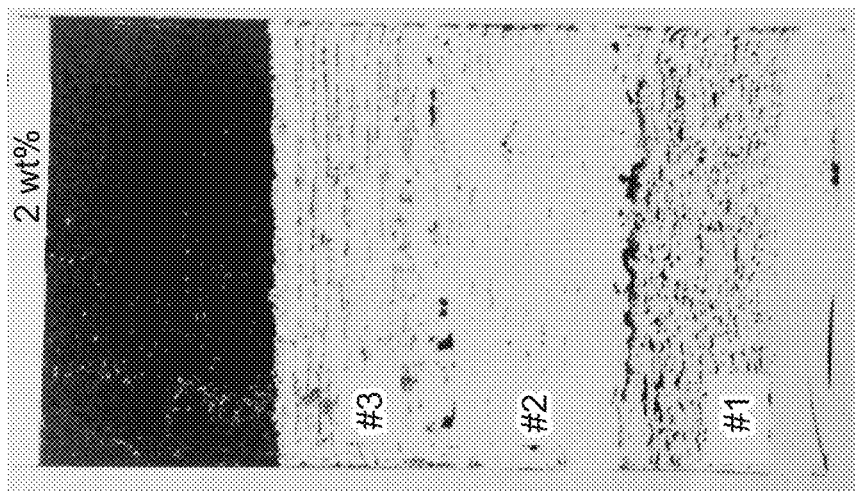
FIG. 15 is an image of an early test of an aluminized slide after anodization.

FIG. 15 shows a photograph of an early test of an aluminized slide after anodization, and back and third from the bottom reflect the stepper step size and anodization and insertion speed not optimal for complete anodization. FIG. 16 shows the results of refined programming of the EA rig, showing nearly complete anodization in six (6) regions of different EA conditions—the boundaries of some regions are nearly invisible. The transparent hard films appeared to be highly scratch resistant with metal tools, and required a carbide scribe. At some larger thicknesses, colored interference fringes were evident. FIG. 17 shows a photograph of a normally illuminated glass slide with 4 edge anodizations. The best anodization is close to the transparency of normal glass, and was formed by Oxalic acid 0.5%, 100V and 200 μm/s. The aluminum film in FIGS. 15 and 16 may be about 6 μm thick.

FIG. 15 is a back-illuminated (on a light box) photograph of an aluminized and then edge anodized slide in early tests of edge anodization technique (EA), in 3 regions starting from the bottom. The 4th top region shows the opaque unanodized aluminum film used as the edge anode contact, as in FIG. 2. The region second from the bottom (labeled with hand drawn "#2") demonstrates nearly complete anodization but shows that the stepper is not being run smoothly enough. Regions 1 and 3 were anodized with rates and currents which left larger and more numerous islands of aluminum unconverted to alumina. The wavy aluminum lines are due mainly to the unstable creep of the meniscus (or wetting line) as the work piece is inserted into the electrolyte anodization bath. FIG. 16 is photograph of a back-illuminated (resting on a light box) aluminized slide in tests of complete edge anodization (ET), in 6 regions with different current density and insertion rates, starting from the bottom. The top region shows the opaque unanodized aluminum film used as the edge anode contact, as in FIG. 2. Nearly all of the aluminum below it was converted to transparent alumina. At 4 of the boundaries between regions where the stepper changes speed and the current is changes, some aluminum lines are left. A hardened steel scribe did not scratch these surfaces, whereas a carbide scribe scratched. FIG. 17 is a photograph of a normally illuminated glass slide with 4 edge anodizations. The best anodization is close to the transparency of normal glass. With respect to FIG. 17, the ambient light transmission is the glass ticket: 5 areas of Oxalic Acid.

Figure 18:
FIG. 18 is an image of a free-standing alumina film.

FIG. 18 shows a photograph of a free-standing alumina film created by edge anodization of a standard aluminum foil about 50 microns or μm $10\frac{1}{4}^r$ thick obtained from a local supermarket. It was anodized completely over a length of about 2.5 cm from the far end. To demonstrate its flexibility and clarity, it was bent or curled to rest conformally against a curled dollar bill and flash photographed. George Washington's face is clearly seen through the anodized foil end.

FIG. 18 is a photograph of a George Washington's head on a dollar bill through a piece of free-standing alumina film, created from a strip of aluminum foil about 4 cm wide and ~10 cm long. The clear anodized film area is about 2.5 cm long by about 3 cm wide starting at the edge of George Washington's face, covering his whole face and neck. The unanodized aluminum strip attached to it blocks an area and may be about 5 cm by about 3 cm starting at the right shoulder of the president and nicking the oval surrounding the "1" in the lower left of the picture. A pen and ruler are included for scale. Such an immersion technique can be made to work on very large sizes provided: (i) if an Al, Mg or other metal film is required on the workpiece, that a sufficiently large aluminization apparatus is obtained—for example bell jars are common for plastic or glass glazing at least in sizes of 4'×8' and even larger; and (ii) a sufficiently large anodization bath (i.e. pool) is obtained in which to edge immerse a large work piece. Such pools are common in the automotive, marine and metals industries in general.

BRIEF SUMMARY OF PREFERRED EMBODIMENTS OF MIP-EA

How MIP-Based Edge Anodization (EA) is an Improvement

Almost all other anodic processes produce an insulating oxide (or other, such as fluoride or sulfide, etc.) insulative barrier layer that terminates the anodization from proceeding to greater depths into the material being anodized. A major issue of anodizing is achieving sufficient thickness of the anodized part, or bonding the anodized film on the surface of the workpiece. Typically, anodized films are at most about few microns thick. The workpiece is also opaque, since normally underneath a transparent oxide barrier layer is the opaque metal or semi-metal. The anodized films formed using Edge Anodization can be made to greater thicknesses, and up to complete anodization of the workpiece. For example, normal anodizing of aluminum leaves aluminum underneath the porous alumina and the solid alumina boundary layer, and the total alumina layer has a finite thickness determined by and limited by the anodization process and resistivity of the alumina, and may not be made thicker, often less than a few microns, and the workpiece remains opaque. Moreover, the variability of the thickness of the nominally transparent alumina film may lead to unwanted reflectivity and/or apparent colorizing of the workpiece from the solid alumina boundary layer. In another example, other methods of forming transparent hard coatings on plastic, glass or other relatively low temperature materials can be limited by the temperatures needed to form such materials, or by relatively lower hardness of deposited scratch-protective coatings. Most other methods to form hard and low index of refraction films are far more costly than the Edge Anodization method described above. Adhesion of or compatibility with other types of films as deposited on substrates is often limited, especially by internal stresses and thermal expansion mismatches, or by environments needed or by other mismatched processes.

Figure 24:
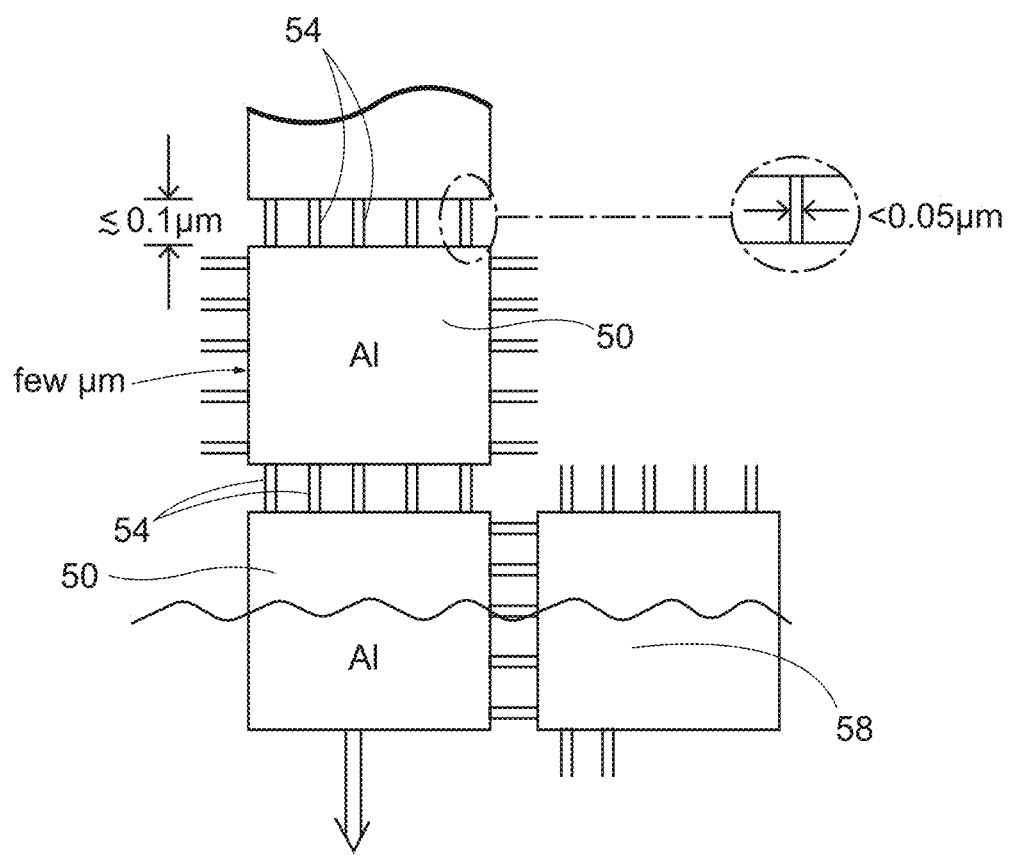
FIG. 24 is a schematic of a stress relief anodization apparatus.

Items or Steps that Make Up the MIP EA of Materials Process Invention.

a. Pre-Processing:

In some cases, the workpiece may require or benefit from pre-processing before the Edge Anodization process. (a) Ordered Pores: One such case is to obtain exceptionally ordered pores in porous anodized material, where the pores are initiated by patterned depositions or physical indentation or other pore initiating strategies. (b) Patterning of the Edge Process on a workpiece: Pre-processes may protect specified areas of the workpiece from anodization, by application of protective films, or by counter-electrical connections which prevent anodization in specific regions, or by deposition in specific regions of the material to be anodized, with connections to each region along the direction of Edge Immersion. Such cases include applications in micro/nano electronic or photonic integrated devices. (c) Adhesion and Stress Mismatch: Another such case is to enhance adhesion of an anodic or Edge Processed film/material formed on a substrate if there is thermal mismatch, stress at the EP film—substrate interface after anodization, or non-conformal issues with the edge Processed material. If the anodic EP film changes its area from the initial area of the metal (Al), a transverse stress may accumulate between the anodic film and the underlying substrate, proportional to the area. In these instances, if the area of the anodic film is sufficiently too large, the adhesion may be compromised, depending on the elastic and surface properties of the substrate Generally, such issues have not been observed with transparent polymers such as acrylic or polycarbonate. The metal to be anodized (or other material in Edge-like Processing) is divided by sufficiently fine mesh lines into separated patches sufficiently small that the processed material mismatch is minimal (typically hexagonal, triangular or square/rectangular surface tiling). The patches remain connected by fine "bridges" (in anodization for example by electrically conductive bridges) in the direction of the Edge Processing. For example in metal anodization the patches are connected by fine metal bridges of the same material or non-anodizing conducting materials so that these anodic "islands" covering the substrate except for the fine lines separating them are formed with stress only over the area of an island and not accumulated over the much larger area of the whole workpiece, analogous to the thermal expansion joints in civil construction. Such patterning could be done by removal after uniform coating (example: a laser which scribes out a patch except for the bridge(s)), or by initial deposition patterning, or by secondary patterning of the fine lines with a resist that prevents the Edge Processing on fine lines which separate the patches. FIG. 24 shows a schematic of stress relieving method described in this paragraph. Sheets of aluminum 50 may be attached to each other by thin bridges 54 of material. Each of the bridges may be about 0.05 micrometers in width and about 0.1 micrometers in length. The dimensions of the sheets of Al 50 may be about a few micrometers per side. An anodization fluid bath 58 is shown.

With respect to FIG. 24, the conducting paths 54 between Al or metal film patches 50 provide stress relief if necessary for the anodized metal film 58. The Al or metal film patches 50 which here shown as squares but can be any tileable regular shape such as hexagons, rectangles or other. The conducting paths are for stress relief after anodizing—the size of the patches is determined for a given substrate and metal film type and thickness by a size that that after anodizing adheres and remains conformal to the substrate. In reduction to practice, Al films of a few microns in thickness after anodizing adhere in patches of a few cm in major dimension on lime glass or Lucite plastic.

For optical hard coatings on transparent substrates, the separation of patches by the length of the array of fine connectors 54 must be smaller than optical wavelengths—typically less than ¼ of a wavelength and as small as feasible—as an example shown here, 0.1 µm, about ¼-⅕ that of green light. Also the width of the connectors must be smaller than optical wavelengths—as shown here is a typical example ~1/10th that of green light. The number of wires per patch is determined by making the combined width of the conducting paths along a side of a patch larger than ~0.1 of the width, up to ~1/2 the width of the patch.

The conducting paths 54 between patches may be a sufficient set fine "wires" as defined in the metal film by deposition, by methods such as photolithography or silk-screening. Another method is to form an array of regularly spaced round or square holes by removal in the metal film to define the patches, that would be similar to the open areas shown between the conducting paths 54 for example by a UV laser used to make lines of sub-micro holes that define the patch. An alternative is a conducting stripe between patches not affected by the anodization but that could be removed subsequent to anodization if opaque. For example a photoresist unaffected by the anodization could be deposited on top of the Al film in stripes to define the patches. The EA film would then have left the unaffected Al film between patches underneath the resist. The resist is then stripped away, and the Al is then etched away.

Another pre-processing method to enhance adhesion is to apply a thin colorless transparent buffer film over the workpiece before depositing the metal film for EA anodization. The buffer film has elastic and adhesive properties that enables complete EA anodization without stress and without patterning or tiling as in the previous methods of stress relief. The thickness and index of refraction the buffer film must be adjusted to avoid unwanted interference or reflective properties that could adversely create color of the EA film. Examples are clear polymers that can be applied as a fluid, gel, thermal, binary compound or other deposition. Polymers as used to make corrective eyeglass lenses and eyeglass lense coatings are applicable.

b. MIP Anode Edge Anodization Connection and Immersion Direction:

This step is the determination of anode connection(s) position(s) on a sufficiently conductive material to be anodized, that will leave a vanishingly small or unimportant unanodized area (the Edge) at the termination of the Edge Immersion Anodization process, that can be removed or discarded at the end of systematically immersing the edge-anode-connected workpiece cross-section/area most distant from the Edge, until the Edge contacts with the anodizing fluid. The current flows through the gradually immersing workpiece, typically 0.1-1 mm/s but depending on current, voltage and chemistry, to the Edge connection. When immersed in a specified direction (the Edge Immersion direction) into the anodizing fluid at a controlled speed, voltage, chemistry, temperature, and current density, the entire workpiece is able to be anodized—the metal or conducting material completely removed, leaving no boundary layer in the case of porous anodization.

c. Electrical Connection and Anode Power Electronic Properties:

The next step may be the connection of the workpiece at the anode connection(s) in Step 1 to programmable bipolar anode power supply(ies) of sufficient voltage (typically but not required ±1-±300V), polarity, current density (a few mA-few A/cm$^2$), impedance (typically 1-15 Ohms), power density (0.1 W-10 W/cm$^2$), and temporal profile programming so that the anodizing rate and properties are controllable as a function of time during the Edge immersion of the workpiece.

d. Chemistry and Cathodic Connections:

The next step may be the adjustment of the chemistry of the anodizing bath(s) in anodizing tank(s) to achieve the desired anodization properties of the workpiece material. Anodization chemistry is commonly available for Al, Ti, Mg, Ni, Ti Zr, and Zn, with Fe alloys less commonly used (black ferric oxide). Many standard anodization methods are described in ASTM standards. Titanium and Aluminum Edge Anodization are particularly useful applications. Typical anodization baths include chromic, sulfuric, oxalic or phosphoric acids. The Chemistry conditions to create highly ordered nanopores in aluminum films or Al workpieces, and to completely Edge Anodize Al to alumina, with the pores terminating on an unanodizable substrate or to the other side of the Al, are an important application of this invention. Borate or Tartrate anodization solutions for Al are of particular interest in methodical Edge Immersion Anodization because they do not dissolve resulting alumina barrier layer, in applications of the process where that would be important. Nanoporous/structured oxides are often produced with other materials systems. In one example, when anodized in an about 0.5 weight percent HF solution for about 20 minutes, titanium forms well-aligned titanium oxide nanotube arrays with an average tube diameter of 60 nm and length of 250 nm. The Edge anodization technique will enable arbitrarily deeper films of titanium oxide, without any remaining titanium. In Edge Anodization, pores formed at the leading edge of the work-piece may be deeper than those formed near the solution interface because they are exposed to the low pH electrolyte longer, and may this etch. To mitigate this effect, the chemistry or concentrations of the anodizing fluid(s) may be adjusted as a function of time and/or spatial gradients along the direction of the Edge Immersion and may be introduced by a variety of methods. Among many examples, some are listed below, as (a) through (f). (a). A temporal chemistry gradient could be obtained by injection of different anodizing fluids over the anodizing cycle. (b). Spatial gradients in concentration or chemistry could be obtained with multiple injected anodizing fluid flows into the tank as a function of position along the edge immersion direction. (c). An example of a step-gradient in chemistry is by separation of regions with physical barriers between fluid regions along the Edge-Immersion direction, with flexible flap-like apertures between the regions which are as conformal as feasible to the cross section of the workpiece being edge-immersed to pass through, thus separating anodization chemistry regions; the fluid in each region can be continuously refreshed. (d). As another example of a very simple spatial gradient of chemistry, a continuous or very long flexible workpiece, such as aluminized optical or other fibers or flexible sheets, could be Edge Immersed, but bent into a curve so as to re-emerge from the anodizing bath into air or to be inserted into a stop-bath or post-processing regions, so that the entire workpiece can be anodized uniformly in a continuous process. This is particularly apt for fibers or ribbons, for example to make optical fibers with a very low index of refraction, or to coat flexible glass or plastic ribbons with scratch-resistance anodized metals. (e) A plurality of cathode connections may be included over different spatial concentration or chemical regions, which may be at different cathodic voltages, as supplied from individual bipolar programmable power supplies over the anodizing cycle(s). (f). If the pores are formed too early, at the start of the process, and begin to become too large or dissolve, the piece can periodically be withdrawn after a set distance of immersion and the pores protected from the anodization bath by a spin-on polymer or similar protective film, which could then be stripped off after full processing. The piece would then be re-immersed to the edge of the protected region (i.e. back to the bare aluminum film) and the edge anodization continued.

e. Temperature:

In the process there should be control of the temperature and temperature temporal or spatial gradients of the anodizing bath between the lowest and highest temperatures (typical practical ranges are about 0° C. to about 100° C. but can be higher or lower), sufficiently accurately, which may be as fine as about ±0.5° C. or finer, with controllable time dependence which may be as fine as sub-1s scales. A temperature spatial gradient in the anodizing tank along the Edge Immersion direction can be specified to affect the pore growth speed or pore spacing an uniformity, for example to ensure uniform (typically lower temperatures near 0° C.) or other controlled anodizing, similar to the effects of a gradient in voltage or chemistry as in the steps above. Such a gradient can be obtained with a plurality of temporal programmable heaters/coolers or fluid injectors along the Edge Immersion direction.

f. Rates/Speeds and Directions of Edge Anodization Immersion:

Edge Immersion into the anodizing bath may be programmed at a rate such that the material to be anodized is either completely anodized, anodized to a specific depth, or completely anodized to an underlying workpiece/substrate, with controlled uniformity or depth, but not so that the anodized material is dissolved away by the end of the process cycle. This may be achieved, for example, by a programmable linear stepper motor, or any other robotic or carefully controlled methods to control the motion of the workpiece's Edge Immersion into the anodizing bath, preserving the connection to the anode outside of the bath until the last edge of the workpiece is immersed in the anodizing fluid. This last thin piece of material is the Edge connection, and is normally removed from the finished Edge-Anodized workpiece. Alternatively, the workpiece could also be gradually exposed to the anodizing bath by controlled removal in a specified Edge Anodization direction of a material protecting the workpiece from the anodizing fluid(s). Such material could be a physical sleeve which is withdrawn, a chemically, thermally or electrically removable coating, or others. In the most basic case, that protective material is the air above the anodizing bath, as the workpiece is methodically Edge Immersed vertically into the anodizing bath.

As an example, in a realization of anodizing 1-10 micron thick Al films deposited on plastic or glass substrates, the speed of vertical immersion in a fairly standard oxalic acid anodizing bath varies between about 0.1 mm/second to about 1 mm/second to achieve highly transparent films.

Figure 25:
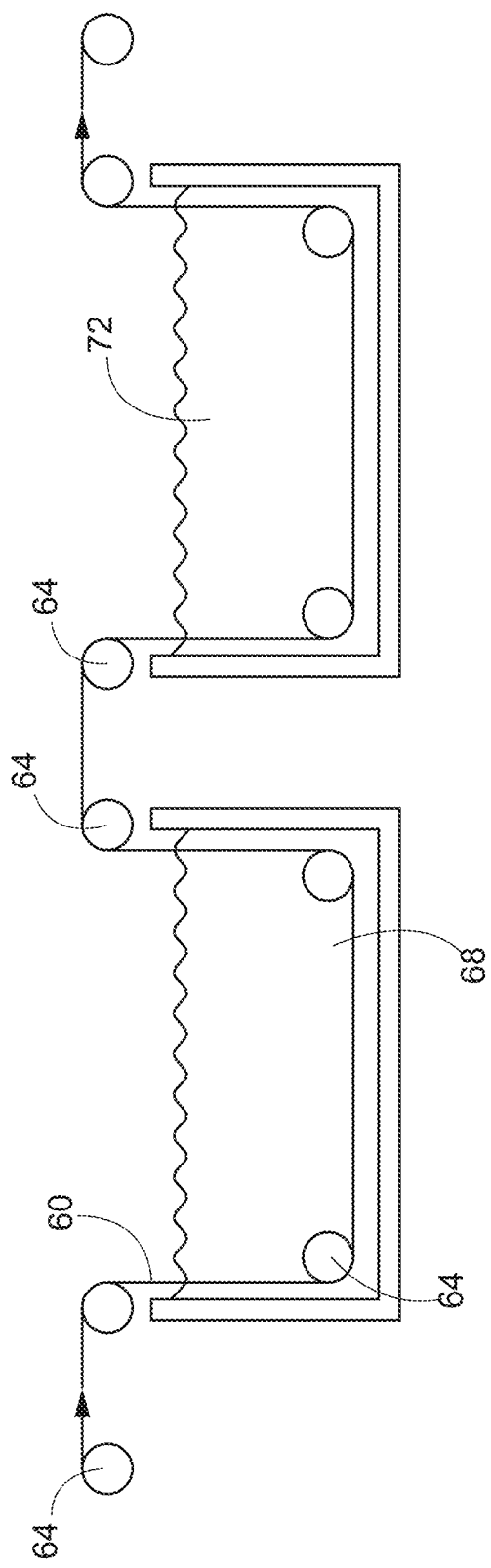
FIG. 25 is a schematic of a roller apparatus.

Another example (as also described above), is a fiber or flexible sheet being Edge Anodized could be curved to emerge from the anodization bath so that further anodization or dissolution does not take place, or to be fed through a flexible aperture into a region that quenches the anodization or further treats the workpiece. FIG. 25 shows an example of the flexible sheet being edge anodized. In this example a flexible sheet of material 60 is moved along rollers 64 through an anodizing bath 68, out of the anodizing bath 68, and into a post processing fluid bath or quench bath 72, and then out of the bath 72.

One characteristic of the immersion technique is that the pores formed at the leading edge of the work-piece will generally be deeper than those formed near the solution interface because they are exposed to the low pH electrolyte longer, and etch. In one realization, if the pores at the start begin to become too large, the piece can periodically be withdrawn after a set distance of immersion and the pores protected from the anodization bath by a spin-on polymer which could then be stripped off after full processing. The piece would then be re-immersed to the edge of the protected region (i.e. back to the bare aluminum film) and anodization continued.

g. Pore Widening or Sealing:

If desired, a pore-widening step may be included in the process where pores result from the anodization. This may be accomplished by chemical baths or any other processes which (normally isotropically) removes the anodized film. In the case of porous alumina, phosphoric acid solutions are often used. In alumina, a thermal steam oxidation or aqueous heating can seal the pores.

h. Pore Functionalization Steps:

If desired in a porous anodization, especially those that terminate on an underlying substrate used in the part being made, a pore loading or sealing step may be included, or other functionalization, such as hydro-phobic or -philic, index of refraction, patterning or other functionalization by deposition, removal or patterning. Pore loading may be accomplished by many film or material deposition techniques from solids, liquids, gasses or plasmas, including MBE, CVD or ALD or other similar conformal or filling processes.

Precursors Necessary to Realize the MIP EA of Materials Process

Many standard anodization (oxiding) process and materials system can be adapted and tuned (as described in the realizations above: chemistry concentrations, voltage, current density, temperature and immersion speed) to Edge Immersion Anodization of Al to form the properties needed in the resulting edge immersed anodic alumina film. Similarly processes for more generalized edge anodization, such as fluoriding, chloriding and others are possible by adapting anodization processes from standard the anodization process details—for example, aluminum, magnesium, and nickel fluoride films can be by obtained by anodization, and hence Edge Immersion Anodization can convert the entire sample to fluorides, in this example.

In one specific and useful realization, the requirements to perform the Edge Anodization process is anodizing completely an aluminum film, about 5 to 10 µm thick, deposited on an insulating substrate such as plastic or glass workpiece, in which the anodic films becomes transparent, hard, and/or nanoporous, are shown in the numbered list below. Conditions such as electrolyte concentration, acidity, solution temperature, and current must be controlled to allow the formation of a consistent oxide layer. Harder, thicker alumina films tend to be produced by more dilute solutions at lower temperatures with higher voltages and currents. The alumina film thickness can range from under about 0.5 µm to about 150 µm in standard anodizations, but with a remaining boundary layer and aluminum.

1. A reasonably pure Al film—99.99% or better Al.
2. A bi-polar power supply capable of ±150V or more.
3. Most standard aluminum anodizing baths, usually acid-based, such as oxalic (0.1-a few wt %) or sulfuric acid similar to battery acid concentrations, but with low contaminates.
4. An anodizing bath vessel, usually of an inert plastic, with an cathode, typically Pb or other chemically resistant metal, with appropriate fluid heater or cooler exchangers.
5. Thermal measurement controls of the bath, and agitation/mixing of the bath.
6. A motor (linear stepper motor or other) capable of sub-micron linear motion, over a distance a least as long as the workpiece, with a programmable controller capable of ~(sub)millisecond or finer steps, installed appropriately on or above the anodizing vessel.
7. Chemical cleaning/rinsing baths, etching/rinsing baths, de-Ox/rinse baths of workpiece (standard anodizing processes), to present bare metal to the Edge Anodization process.
8. Mount of workpiece to insertion stepper, power supply connection to the Edge Anode, and cathode.
9. Programmed process parameters Temperature, Time, Velocity and Voltage, and Edge Immersion insertion.
10. Post-rinse bath.
11. Post Processing such pore sealing, pore filling, or others as needed.

General MIP of Materials Embodiments—I a) MIP of Materials—the Slice/Layer Processing Case—an Outer Surface Process Section Moving Through the Workpiece to a Far Surface This materials modification process is the technique of supplying a surface, edge, layer, or restricted volume of a workpiece to some source of process energy or process technique that is used to modify the material of the workpiece, starting from a specific place on the surface of the workpiece, and moving that process surface methodically through the workpiece. Normally a planar slice of the workpiece is envisioned where the processing is taking place, but in principle the slice could be any surface shape. At controlled rates of speed and of process energy density delivery, the workpiece is methodically exposed to process energy or processing, starting from one surface, edge, layer or restricted volume of the workpiece, rather than the entire workpiece at once, with the processing restricted to a surface or small volume, slice by slice. That processing surface or volume or layer or "slice" then moved through the entire volume of the workpiece to the unprocessed regions, controlled so that the entire workpiece is uniformly processed. The motion of the energy or process technique exposure is directed away from the original layer, surface or edge, until the entire workpiece has been processed.

This moving surface process is useful in cases of materials modification processes such that if a three-dimensional workpiece were otherwise fully exposed to the process or process energy source on its entire outer surface, the resulting processed surface layer would self-limit the energy/processing delivery into the bulk of the workpiece, and so the entire bulk is not processed; rather, just a surface layer is processed which prevents or slows further processing of the bulk.

In one example, metal anodization almost always self-limits anodization of the entire workpiece, as it creates an insulating barrier film, so that immersion of a metal workpiece into an anodizing bath only anodizes a surface film and not the entire metal. The specific application of this is Edge Anodization (EA) in this example will avoid this problem of self-limited anodization.

Another example is a thermally driven process, where a workpiece is normally immersed into a heat source or bath, and the process makes the processed material thermally insulative, thus inhibiting the speed of processing. Using the disclosed Edge Anodization technique, heat energy is injected into one edge or layer or "slice" of the workpiece and the slice of injected thermal energy is then controllably moved towards the far edge of the workpiece, enabling a much thicker layer or complete processing of the workpiece to be produced.

In another example, UV curing of plastics can result in a surface layer which is UV reflective or absorbing, inhibiting or delaying the curing process. MIP can overcome this inhibiting or delaying.

MIP—EA Edge Anodization Process and Edge Processing Advantages

Produces thicker anodization layers, wherever anodization is used at present, for example for protecting underlying metal. Edge Anodization enables many metallic films (Al, Ti) on arbitrary shapes or sheets, wires, foils, or other shapes to be completely converted to the oxide (or fluoride, etc.) form. A basic advantage of the EA process is that the pores formed in a deposited Al film may be made to terminate on the substrate; the pores then provides electrical and thermal access to the substrate. As an example, transparent hard coatings, such as alumina formed on plastic or glass, can be formed from Al deposited on the surface by Edge Anodization, or Mg to MgF2. Edge Anodization processing of other conductive, semi-conductive or semi-insulating materials beyond metals, either as films or bulk. Such material processing includes electro-chemical and photoelectrochemical etching or removal of Si, Ge, II-VI or other semiconductors or carbon-based materials such as diamond. Some forms of EA produce highly porous or nanostructured films (such as nanopillars or wires) which have many applications as discussed below, whether free-standing, or formed on substrates, without the underlying material remaining.

Applications of MIP Edge Anodization (EA)

Some applications include using a thin anodized layer of material on other materials for a transparent and colorless scratch resistance surfaces, especially where the pores terminated on the surface of the substrate. Such applications would include: plastic or glass glazing, windows and lenses such as acrylic or polycarbonates, softer glass for home and commercial buildings; glass for vehicles or drones; electronic displays such as on cellphones; eye glasses or sunglasses; any applications where glass or plastic is used for colorless transparency as a window or lense or protective material. For example, using a plastic (polycarbonate) window/glazing with an anodized layer of material would have only about 40% of the weight of glass, and be nearly unbreakable, while maintaining scratch-resistance. Such polymers may be cast in nearly arbitrary shapes, such as the bubble-like windscreens of airplanes. The coatings would be from Edge-Anodized aluminum or titanium. The hardness of alumina films varies between about 10 to about 20 GPa, and MOHS between about 7 to about 9. On substrates, the Knoop Microhardness of $Al_2O_3$ films is about 1,000 kg/mm2. For example, glass used on cellphone displays could be made more scratch-proof (thus decreasing the chance of shattering) or the glass could be replaced entirely by similarly coated plastics. Flexible transparent materials such as thin specialized glass films or ribbons or plastic films could be made with highly increased scratch resistance using a MIP Edge Anodized layer of material.

Other applications include general scratch resistant coatings. The coatings may be opaque or not as applied to metals, plastics or other materials. For example, aluminum deposited on other metals (especially metals which resist the Al anode chemistry) could be converted by EA to a hardened thick insulative film capable of very high temperature/refractory operation (unlike plastic insulative films). An example would be metal wires: thin gold film a few nm thick overcoated with, say, about 10 to about 50 μm of Al, could be anodized to form a highly resistive and robust conformal insulator capable of high temperature operation. This could be scaled down to wires or surfaces in VLSI/microelectronics.

Another application would be functionalized coating applications after anodization. Films of porous anodized materials can be pore-loaded or pore coated with materials or treated to produce other properties after the EA process. The methods to fill or coat pores include liquids, doctor-blading soft materials, vacuum deposition techniques, CVD/MOCVD, ALD, MBE or other film technologies from the liquid, slurry, viscous, gas or plasma technologies, like adhesion, or drug-delivery, where completed or near complete pores would be useful.

The disclosed method can be used in filled or coated pore applications. For instance, with respect to printing, such as inkjet printing (ink or others—deposition of small quantities in a spatial order), the highly anisotropic pores of a completely or nearly completely anodized film could make an image without ink spreading as in the case of random porosity or fibrous materials such as paper. A plastic film (white or clear) with an edge anodized Al film top surface would make a very high dynamic-range and high-precision pixel surface for reproduction, down to the 10's of nm scales. The disclosed method can be used for scintillator such as phosphors or other light-emitting/luminescent materials, including electroluminescent.

The disclosed method can also be used with drugs or chemicals in precise dosages; aliquots as a chemical libraries; Magnetic materials, since the anisotropy forms N-S orientations.

In addition, the disclosed method can be used with adhesion and sealing because pores in EA surfaces can be filled with liquid or viscous adhesives, polymers, or other materials which may: a) Seal the pores from the atmosphere or environment; b) Add strength to the pore walls for scratch-resistance. Materials which when solidified or cured by heat, light, radiation or other energetic so that they shrink slightly in the pores to preserve the hard anodic material at the surface; c) Adhesion: if the anodic material is formed on another surface, the pores can be loaded with adhesives to enhance the adhesion of the anodic material to the substrate. d) Sealing of the surface, leaving pores underneath can be obtained by steam oxidation for anodic Al, and for all porous anodic materials by oblique deposition of sealing materials, so that a void is left under the sealed top. Line of sight vacuum deposition at angles to the surface <45°, with periodic rotation will seal the pores leaving >½ the pore depth intact. B7: Hydro-philic or -phobic coatings, especially useful for hard coatings on window materials exposed to the weather or other environmental factors. Hydrophobic films keep sub-micron pores open under rain or immersion conditions.

The disclosed method can be used for precise binary or more mixture precursor, where alternating pores or pore areas, or in alternating films are filled with two or more substances which subsequently are forced together to form a highly uniform compound without extensive mixing.

The disclosed method can also be used to obtain certain optical properties. If the anodic film is used in optical applications, the pores can be loaded with transparent, colored, opaque, neutral density, electro-optic, magneto-optic, or other passive or active materials, either uniformly, or patterns, and either fully filled, partially filled, sealed, or as a thin film on the pore walls. Example of the results include: i) haze reduction, ii) adjust the index of refraction upward, iii) create polarizing effects, iv) create dichroic filters or bandpasses; v) create optical gratings; vi) create patterned optical pathways; vii) anti-reflection films by tuning the index of refraction of the anodic film to the optimal geometric mean index—that is: $n1=\sqrt{n_o n_s}$ where no is the index of air, and ns is the index of the anodic film; (viii) Materials absorbing or transmitting specified wavelengths of light can be used in the pores as filled or coated for filters or other optical effects. Highly absorbing films deposited on the walls of the pores create a material that passes light over a narrow range of angles of incidence, the maximum angle $\theta$ to the surface being given approximately by $\sin \theta \sim$(pore diameter/pore length).

The disclosed method may be used with low index of refraction coatings. For instance, Low Index Anodic Material: $MgF_2$ or other low index of refraction films used for AR (anti-reflection) coating may be produced by edge anodization could be used for (scratch-resistant) low index anti-reflection coating with index $n_1$. The disclosed method may be used with low index via highly nanoporous anodic films. As an example anodic alumina films have indices of refraction as low as 1.08 due to an air fraction of 65%-75% in the highly porous films, up to the index of the alumina itself n~1.7. The index can be lowered or raised from this value by pore size and spacing, or by filling the pores with relatively low index materials such as Teflon AF or higher index materials. Although heterogeneous, if the pores are much smaller than the wavelengths of light, the nanoporous film can be treated as a homogeneous average (details in following sections). Anti-reflection coatings would result in films by tuning the thickness of the film and the index of refraction of the anodic film to the optimal geometric mean index—that is: $n_1=\sqrt{n_o n_s}$ where $_{no}$ is the index of air, and $n_s$ is the index of the anodic film. For the example of glass ($n_s \approx 1.5$) in air ($n_o \approx 1.0$), this optimum refractive index is $n_1 \approx 1.23$, difficult to obtain from available materials to make a completely an AR (anti-reflective) film. Even ¼ wave $MgF_2$ is a compromise, allowing ~2% reflectivity. For plastic with n=1.6, $n_1 \approx 1.26$ also unavailable with any convenient coating. In addition, the disclosed method may be used in total internal reflection applications—light guiding and optical fibers by using the anodic film as a cladding with n much less than that of the fiber core. Such films with n<1.32 could even totally internally reflect light transport in a water core. Normal glass optical fibers cladded with such an Edge-Anodized nanoporous transparent film would have a numerical aperture NA of ≥0.9, and could transmit 3 to 4 times more light than ordinary clad fibers for a given core diameter. These would have applications in laser machining, surgery, optical power transmission (especially for tethered drones used in construction or repair industries, or military), drug & chemistry R&D, analog sensors based on optical signals, and many other applications. Typical optical fiber performance is shown in the figures below.

Figure 19:
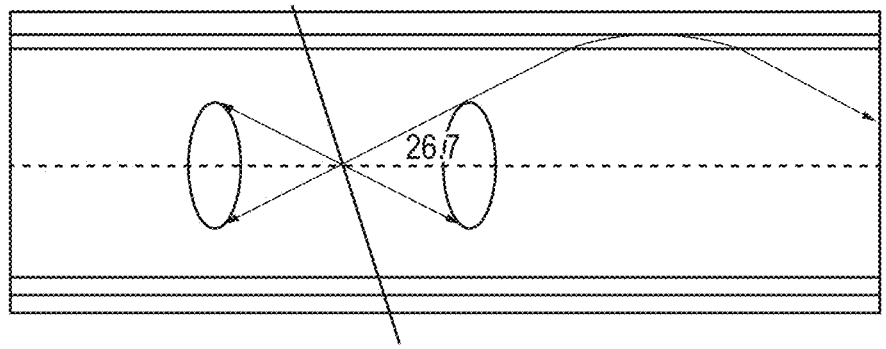
FIG. 19 is a drawings of cartoons of light trapping in a plastic scintillating fiber.
Figure 20:
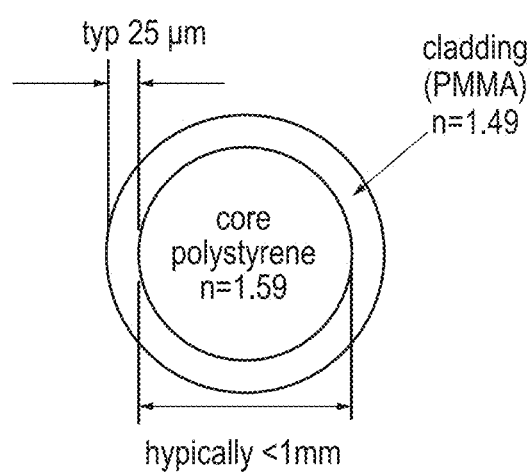
FIG. 20 is front view of the fiber from FIG. 19.
Figure 21:
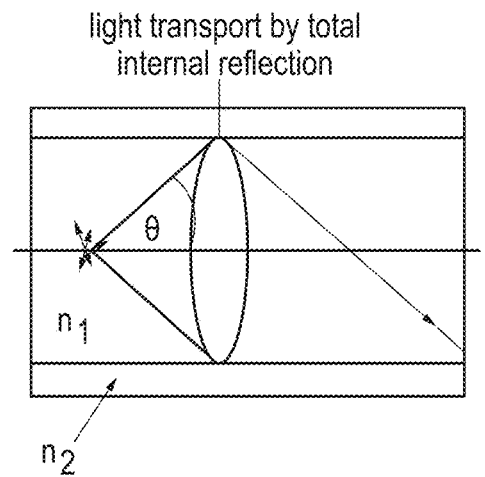
FIG. 21 is a cartoon of light transport by total internal reflection.

FIGS. 19, 20, and 21 show cartoons of light trapping in a plastic scintillating fiber. The angle $\theta$ is the trapped cone angle.

Figure 22:
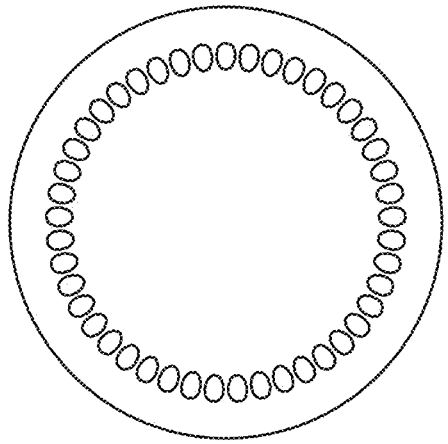
FIG. 22 is an image that shows a MEMS-fabricated silica fiber.

FIG. 22 is a photograph that shows a MEMS-fabricated silica fiber with effectively a near-air index of refraction cladding, and an NA≥0.9. If instead of using MEMS, a film of ~5 microns of Al coated a fiber and were edge anodized, it would result in a nanoporous low-index cladding closer to air.

The fraction of light piped to each end of a fiber is shown in the cartoon of FIGS. 19, 20, 21. The fraction f piped is given by the cladding $n_2$ and the core $n_1$, the critical angle_$\alpha$, maximum accepted cone half-angle $\theta$, and the Numerical Aperture NA by:

$$f=\tfrac{1}{2}(1-n_2/n_1) \quad (4)$$

$$\sin\alpha = n_2/n_1 \quad (5)$$

$$NA=(n_1^2-n_2^2)^{1/2}=\sin\theta \quad (6)$$

[Adding skew rays: $f \sim 1-(n_2/n_1)^2$].

Typical fractions of light generated in the fiber and trapped per end are f=about 3 to about 4% for single-clad commercial plastic fibers. If the cladding could be made to have an index of 1.2, the fraction trapped would rise to about 12.5%, about tripling or quadrupling the trapped light fraction. A cladding index of 1.4 would double the fraction of trapped light, to about 6 to about 7%, as compared to the example with a polystyrene core and a PMMA cladding as shown in the Figures. The NA could exceed about 0.9. The number of reflections in terms of the diameter core d length of fiber L critical angle $\alpha$ by: $N=(\cot\alpha)L/d$. The cladding must be >5 wavelengths thick.

Because the pores are far smaller than visible wavelengths, the resultant heterogeneous films can be considered uniform for the optical properties of visible light, and have an index of refraction for heterogeneous media given by several possible formulae 2 which bracket the possible extremes: (a) Parallel: $n \sim fn_p+(1-f)n_o$; (b) Series: $1/n \sim f/n_p+(1-f)/n_o$; or (c) Drude: $n^2 \sim fn_p^2+(1-f)n_o^2$, where f is the porous fraction of the film, $n_p$ is the pore index, equal to that of air (i.e. $n_p=1$) unless filled, and no is the oxide matrix index. The smallest measured index in the literature for porous anodic alumina (PAA) films is $n=1.08^3$. For the form of PAA here (boehmite, γ-alumina), for example, no~1.75, and so for f=65% porosity, easily achieved, the index of the film is bracketed by n in the ranges of about 1.26/1.18/1.3, respectively, as calculated for the 3 formulae above, low enough to capture significantly more light in fibers with such a cladding. For n<1.33, such a material could pipe light from a water core n=1.33 (if the pores were sealed with an obliquely applied film, as commonly used in anodic products or with a steam oxidation). Low cladding n increases the trapping fraction significantly and enables far better detection of sensor signals or power delivery even with the thinnest fibers. At cladding n=1.3(1.08), with a core index of 1.6, the NA>0.9, approaching 1, and 9% (16%) of the light is transmitted, a factor of 3(5) over the best plastic fibers. For quartz cores (n=1.54), 8% of the light is transmitted. For a water-core cylindrical light guide, with a claddings of 1.26 (1.08), 2.7% (9.4%) of light is transmitted per end.

Applications related to low index of refraction coatings include fiber-based analog sensors for chemistry, biomedical or industrial processes or others, where the light from a sensor at the end of the fiber must be captured by the fiber. The sensors either produce light proportional to a property or parameter being measured, or modify a light pulse proportionally to the property being measured. In either case, increasing the signal by about three to about 4 times is an important benefit to the signal to noise ratio or accuracy of the measurement. Another application is anti-reflective coatings The simplest interference anti-reflective coating consists of a single thin layer of transparent material with refractive index equal to the square root of the substrate's refractive index. In air, such a coating theoretically gives zero reflectance for light with wavelength (in the coating) equal to four times the coating's thickness. Reflectance is also decreased for wavelengths in a broad band around the center. A layer of thickness equal to a quarter of some design wavelength is called a "quarter-wave layer". The most common type of optical glass is crown glass, which has an index of refraction of about 1.52. An optimal single-layer coating would have to be made of a material with an index of about 1.23. Unfortunately, there are no solid materials with such a low refractive index. The anodic film could be tuned to precisely that index, and with ¼ thickness of green light wavelengths, or ~125 nm.

A key application of these nanoporous claddings is that power delivery over fiber would be enhanced by these techniques. The dielectric breakdown of alumina as a cladding material would exceed typical high dielectric used in glass fibers by factors of about to about 10. Power over fiber could exceed about 2 to about 3 GigaWatt/mm$^2$ (or ≥about 10 kW/10 μm core). Applications include: i) laser machining; ii) surgery; and iii) lighting. A 10 μm core fiber could deliver about 10 to about 15 horsepower effective light-to-electric power, assuming 50% resonant conversion (i.e. the same wavelength photodiode as the laser driver; the laser could be the fiber itself) delivering 20-30 hp of optical power to the "solar-cell" resonant converter. Drones-powered-over-fiber could lift substantial objects for elevated construction or repair, such as tree work, painting, window cleaning, elevated wiring, or delivery of construction supplies to upper stories.

The disclosed method can be used to make filters. Porous free standing edge anodic films can be used for filtration, but have the advantage of not needing to be back-thinned as used presently with anodic Al filters. As an example, a thin aluminum film backed by a stronger open web of structural material (for example, an aluminum film or sheet on top of a supporting mesh—the mesh with major diameter openings about 1 mm, between walls about 10% as wide as the mesh open diameter, in polymers, metals, ceramics or other structural materials) could then be edge anodized to form a filter of pores capable of removing particles down to virus sizes. The mesh is designed so that the pressure on the anodic film covering the mesh opening will not burst. If the mesh backing were metals or ceramics, the filter could be cleaned of organic/biologic materials by ashing at elevated temperatures. Because of the anisotropic pores, they can be cleaned by back-washing—a fibrous filter like paper HEPA filters—entraps particles and cannot be easily cleaned by flow reversal. With pore-widening, the porosity can be made exceptionally high, ≤70%, much exceeding the porosity of typical fibrous filters, <few %. Simple filter masks would be far easier to breath from, and self-clean with exhalation, capable of removing virus particles. In summary, these MIP EA filter can have the following properties: a) cleaning by refractory ashing; b) back-stream cleaning; c) highly uniform pore size distributions, with major diameters ranging from about a few μm to 10's of nm, in single sizes, or, with post-processing, multiple precise sizing; d) high porosity up to 70%; e) walls are functionizable to extract from or insert into the gas/liquid stream chemicals as the fluid passes through the filter.

Figure 23:
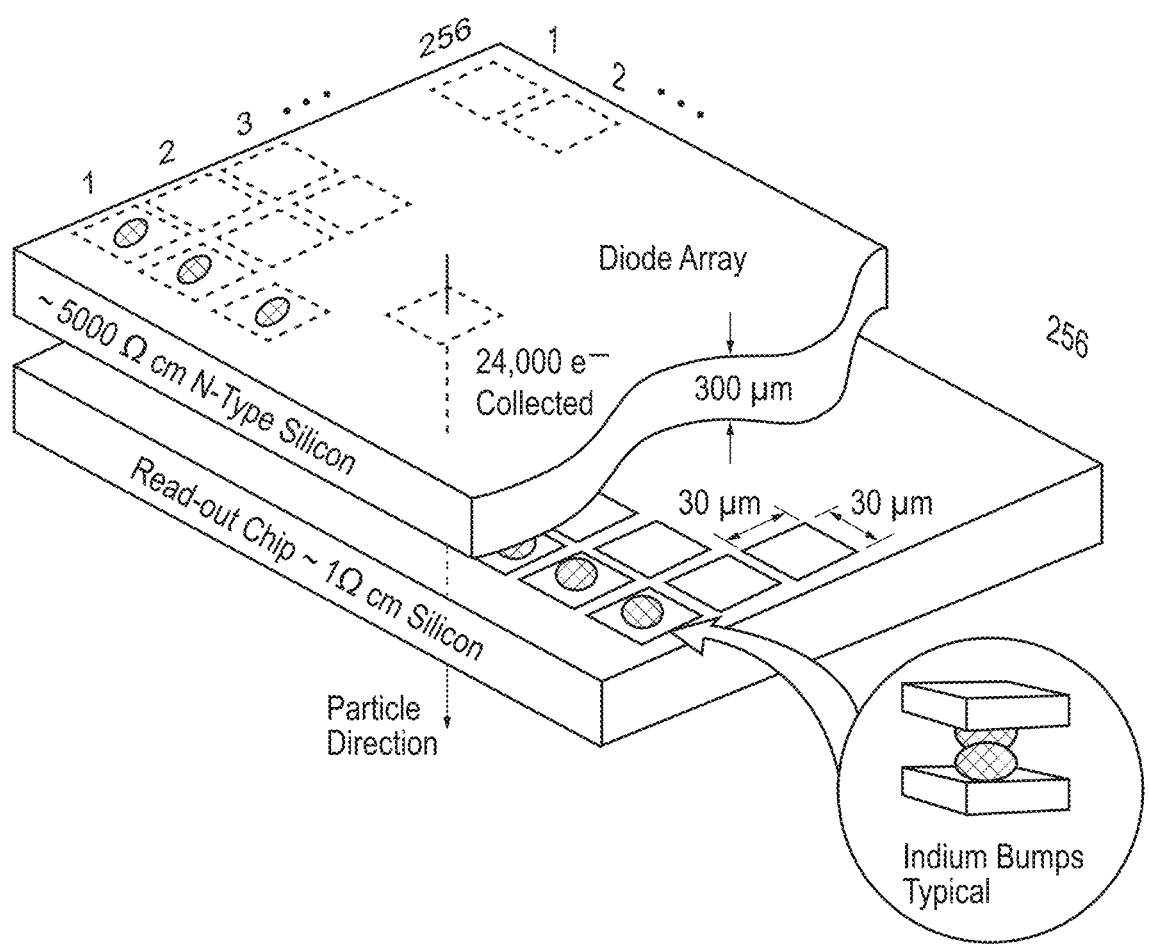
FIG. 23 is a perspective view of an example of a conventional Z-axis connector using indium bump bonds.

There are also electronic and micro/nano electronic applications of the disclosed MIP EA where nanopores without underlying metal must contact with other electronics. These include: i) Z-Axis Connectors: where a dense array of nanopores, the pores perpendicular to a planar VLSI circuit, are created on a microcircuit. The nanopores are post-process filled with conducting nanowires (usually metal). The resistance parallel to the surface (x,y) is insulative because of the oxide walls, whereas the resistance perpendicular (z-direction) is typical of metals; thusly 2 chips which present connection pads can be connected along the z-direction. If the pads on one chip are large enough, the placement can be without high precision placement—the z-axis connector serves as a fan-out of submicron pads on the underlying chip if areas on the topside are large enough for macroscopic connection. FIG. 23 shows a conventional z-axis connector. Instead, a nanoporous anodic alumina film would be fabricated on top of one chip, patterned with materials blocking areas of unwanted z-axis connections (such as polymers), the open pores made conductive with metal films or solid metal (via ALD, CVD, MBE or others), the blocked areas stripped off, followed by a brief chemical etch to dissolve a portion of the anodic film, leaving the metal posts slightly raised above the surface. A soft metal (such as In or Pb) is electroplated or functionalized ALD onto the exposed tips, or any conducting paint or adhesive applied. The second chip would then be flipped and attached to the z-axis layer by compression and/or low temperature softening and melting. ii) Low Dielectric Constant Layers: near that of air, fully insulating, for high speed on-chip strip-lines or lowering the capacitive coupling of the lines on chips, or insulation of the gate layers of microfabricated transistors. iii) High Dielectric Layers: Anodic films filled with high dielectrics, for capacitors, where the anisotropy of the pores causes the dielectric constant to be larger in the pore direction, or to prevent dielectric breakdown by isolating the dielectric from neighboring pores. iv) Insulated Wires: Insulating copper, aluminum or other metallic wires, either microelectronic or macroscopic, by coating the wire with aluminum (or other) and then EA. The anodic coatings have high resistivity and operate at refractory temperatures. v) Lithographic masks: the pores on the sub-micron scale can be blocked or filtered or removed with the patterns used to process chips. For examples: a) to deliver light/x-rays, liquid, gas or plasma to specified areas of the chip; b) to block or resist areas to be protected from energy or chemistry. With appropriate etching of an anodic film on the chip, it can serve as a photolithographic contact mask. vi) Imaging Sensor Chips: a) An anodic porous film can be used as a pixel color filter by fabrication in-situ on top of an imaging chip by filling the resulting nano pores with the appropriate RGB or CYM or more colors filtering materials. Since the anodic film can be 10's of microns thick, very high color contrast can be had; b) the nanoporous anodic film can serve as a contact or "fly's-eye" collimator which may sharpen images and focus.

FIG. 23 is a perspective view of an example of a conventional Z-axis connector using indium bump bonds. Using the disclosed MIP EA method described, then instead of a conventional Z-axis connector using indium bump bonds, a nanoporous anodic alumina film would be fabricated on top of one chip, patterned with materials blocking areas of unwanted z-axis connections (such as polymers), the open pores made conductive with metal films or solid metal (via ALD, CVD, MBE or others), the blocked areas stripped off, followed by a brief chemical etch to dissolve a portion of the anodic film, leaving the metal posts slightly raised above the surface. A soft metal such as In or Pb is electroplated or functionalized ALD onto the exposed tips. The second chip would then be flipped and attached to the z-axis layer by compression and/or low temperature softening and melting.

The disclosed method can be used for the MIP of materials. For example, for a material with an inner process layer/volume where it is desired to have processing moving or expanding outwards to the workpiece surface. Thus MIP can be used as a modification of slice or layer processing which can be used mainly on soft, gel or liquid materials to be processed. Thus, MIP in this case comprises supplying the energy first into the interior of the workpiece with an array of fine delivery probes or energy focal points, arranged to be: i) consistent with the shape of the finished workpiece, and then controllably withdrawn so that the processing volume moves methodically to the surface of the workpiece; ii) the focal points or delivery probes are arranged as a planes or tiles of a closed surface inside the workpiece, which are then moved outward to the surface. For illustration, a "toy" example may be a spherical workpiece. A small spherical region in the center of the spherical workpiece would receive the first processing energy, and then an expanding spherical shell of processing would proceed, with the process energy growing with the square of the distance to the initial process start. In one embodiment of this is when UV, thermal, chemical, microwave, x-ray, electric current or other energy are needed to cure/process soft/viscous/liquid materials, but the cured the material decreases the transport of energy to underlying unprocessed material. As a specific example, some materials become opaque to the UV when cured by UV. If UV flood-illuminated from the surface, a workpiece has a cured surface layer which stops or inhibits the curing of the bulk. Instead, a soft or liquid material could be cured beyond the surface layer by, for example, immersing the energy curing source into a workpiece with a volume shape fitted to the shape of the workpiece, and then moving and expanding area of the energy source towards the surface of the workpiece, curing the entire workpiece, rather than just the surface. A UV-cure example might be an array of UV emitting lasers or LED, focused with variable focal lenses towards the center of the workpiece, such that the energy in the unfocussed parts of the beam are less than sufficient for curing. The foci are then decreased and rastering away from the center. X-ray, gamma-ray or particle beam cured workpieces could utilize energy focused similarly. A similar example is an array of UV transmitting optical fibers or capillaries with a chemical hardener inserted into a polymer precursor at various depths to be cured and then withdrawn. For example, a thermally driven process, where a workpiece is normally immersed into a heat source or bath, and the process makes the material thermally insulative, heat energy is injected via conduction probes or focused microwave or IR energy, and controllably exposed outwards from the interior towards the surface.

The disclosed method can be used for the MIP of materials in a rastered small process volume case such as manufacturing a 3d part tool. This embodiment of MIP has similarities to 3D additive printing tools. Instead of adding material with a stepped raster to form a part, in the MIP case, a very small volume of processing energy is rastered through the volume of a precursor material, so that the processed material, slice by slice forms the workpiece. This can be applicable to liquid or very soft volumes of precursor, where a part would be produced from processing the liquid or slurry into a solid (as in plastic cross-linking or ceramic greenforms or metal sintering preforms), or other material volumes were the unprocessed material precursor could be easily removed (examples: dissolved, thermally chemically removed, or any other processes which do not affect the MIP-processed part). One example would be a volume of liquid precursor—a UV curable liquid plastic or a sintering slurry. A "processing head" of processing energy (often similar to a 3D "print-head" but not for additive deposition; rather for processing energy or technique) device would be rastered through the volume of the liquid, turned on and off where the part needed to be formed by curing/processing rather than by deposition as in present 3D printers.

For example, a UV optical fiber with a microlense or diffusor at the far end, and driven with deep UV light that had a sub-mm absorption length in the liquid could form the "pixels" and then slices of a part.

Another embodiment would use a pulsed thermal tip to process ceramic green form slurries into a part. The remaining unprocessed liquid or slurry would be drained off to be used again.

Another realization of this would be to deposit a thin layer (a thin film) of precursor material on the bottom of the inside of a processing tank, and the processing head would then solidify the slice of a 3D part. Another thin layer or film of liquid or soft material would be deposited and the process head would repeat for the second slice. The processing head could be a scanning laser, like a laser printer; a capillary or ink-jet like chemical dispenser; a thermal pulse head; electrode(s); or others.

The general technique described herein is controlled movement of a processing energy or process technique, which is otherwise normally applied to the entire outer surface of a workpiece, but does not readily process the entire volume of the workpiece, and inhibits further processing below the surface exposed to the process. A specified small area, slice or volume is processed and the process energy is then moved methodically through the entire volume of the workpiece. The process energy may be electric current as in anodization, focused or delivered UV, visible, IR or microwave electromagnetic energy, chemical energy, thermally conducted energy or other techniques where the processing normally does not penetrate to sufficient depth. The workpiece is moved relative to a fixed process surface or volume, or the processing technique surface or volume is moved relative to the fixed workpiece. Prime examples include: a) complete or much thicker anodization of metal parts, where an edge of a metal workpiece is methodically immersed at controlled rates into an anodizing bath; b) liquid or soft precursor materials (plastics, gels, sintering slurries, greenforms, and the like) processed into solid shapes via injection of light over the volume. Examples include electromagnetic energy focusing, optical fibers, electrical or thermal contacts, or capillary injection of chemical hardeners or reactants and similar array processing; c) a form of 3D part manufacturing based on processing a 3D part out of a volume or successive thin films of precursor by rastering a hardening process throughout the volume of a precursor via a "process head", rather than by additive 3D printing head.

Edge processing, as described in this document comprises the following steps. Supply one edge of a workpiece to material processing energy source (e.g. thermal, optical, RF, electrical, magnetic, mechanical, diffusive, etc.). At controlled rates of speed and process energy power, the workpiece is methodically exposed to the energy starting from the far unconnected/unexposed edge, with the motion directed towards the connected/exposed edge. The edge processing technique described in this document may be used in cases when if exposed to the energy source the process self-limits the energy/processing delivery as it proceeds: a surface layer is processed which inhibits deeper processing of the bulk. Using the disclosed edge processing techniques, one can achieve γ-alumina/Al2O3 which is up to about 70% porous. In addition, the anodized layer may have a MOHS Scale close to 8 (harder than quartz) and/or Knoop Microhardness (diamond-like carbon).

Figure 26:
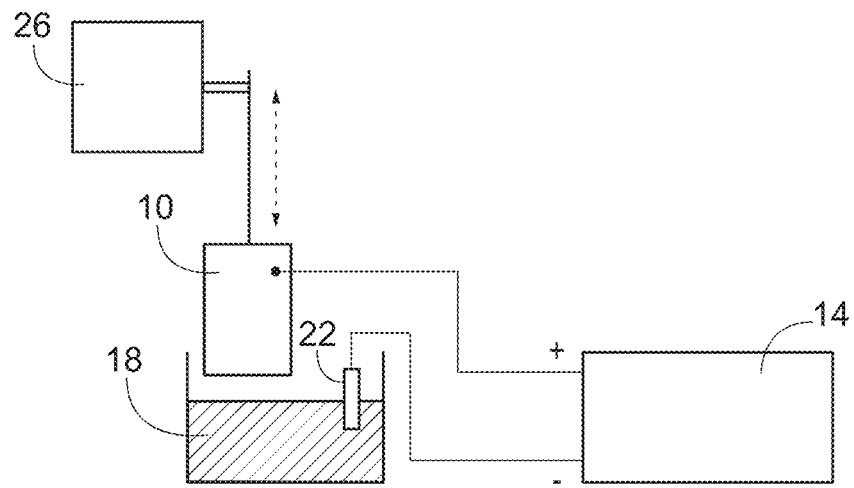
FIG. 26 is a schematic diagram showing a disclosed apparatus for forming transparent colorless hardcoating films for optical materials with a tunable index of refraction and scratch resistance anodic aluminum films.

FIG. 26 is a schematic diagram showing the disclosed apparatus for forming transparent colorless hardcoating films for optical materials with a tunable index of refraction and scratch resistance anodic aluminum films. A motor 26 moves a workpiece 10 into and out of an anodization bath 18. The anodization bath 18 has a cathode 22 in communication with a power supply 14. The power supply 14 is also in communication with the workpiece 10, which causes the workpiece 10 to act as an anode. The workpiece 10, in this embodiment, comprises a metal film on a the surface of a substrate, the substrate may be any suitable material, including but not limited to plastic or glass for scratch-proof glazing or windows (displays etc.). The films may be used on optical fiber cores for claddings, and for colorable surfaces on insulating sheets, and for metals or conductors unaffected by the particular anodization process (for example, on graphite or lead or gold). This process may be used for transparent hard coatings, and adjustable index of refraction coatings for claddings.

Figure 27:
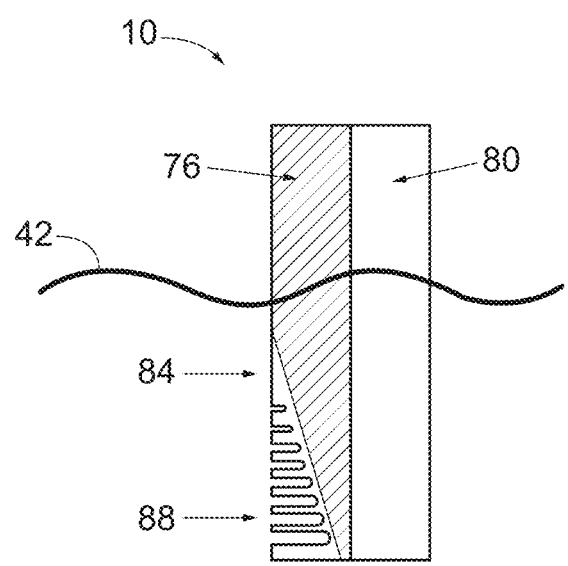
FIG. 27 is a schematic diagram of the workpiece from FIG. 26.

FIG. 27 shows the workpiece 10 from FIG. 26. The substrate 80 may be an insulating substrate. An aluminum film 76 may be formed on a surface of the substrate. The longer the workpiece 10 is below the surface 42 of the bath 18, the more porous it becomes. So at region 84, the aluminum is anodized into solid oxide, at region 88, the aluminum is anodized into porous oxide.

FIGS. 26 and 27 show an edge anodization technique. The workpiece 10 may be an aluminum film deposited on a substrate. The workpiece may be attached to an anode connection at one extremis. The workpiece 10 is controllably immersed/exposed to an anodization bath, starting at the edge of the workpiece farthest from the anode connection. The process is controlled by speed of exposure to the anodization bath, voltage temporal profile, chemistry, temperature, current density, and other factors. There is a connection at all times via the underlying Al to the remaining Al, until the workpiece is entirely immersed in the anodization bath, and the Al entirely converted to alumina (except a small area at anode connection).

Figure 28:
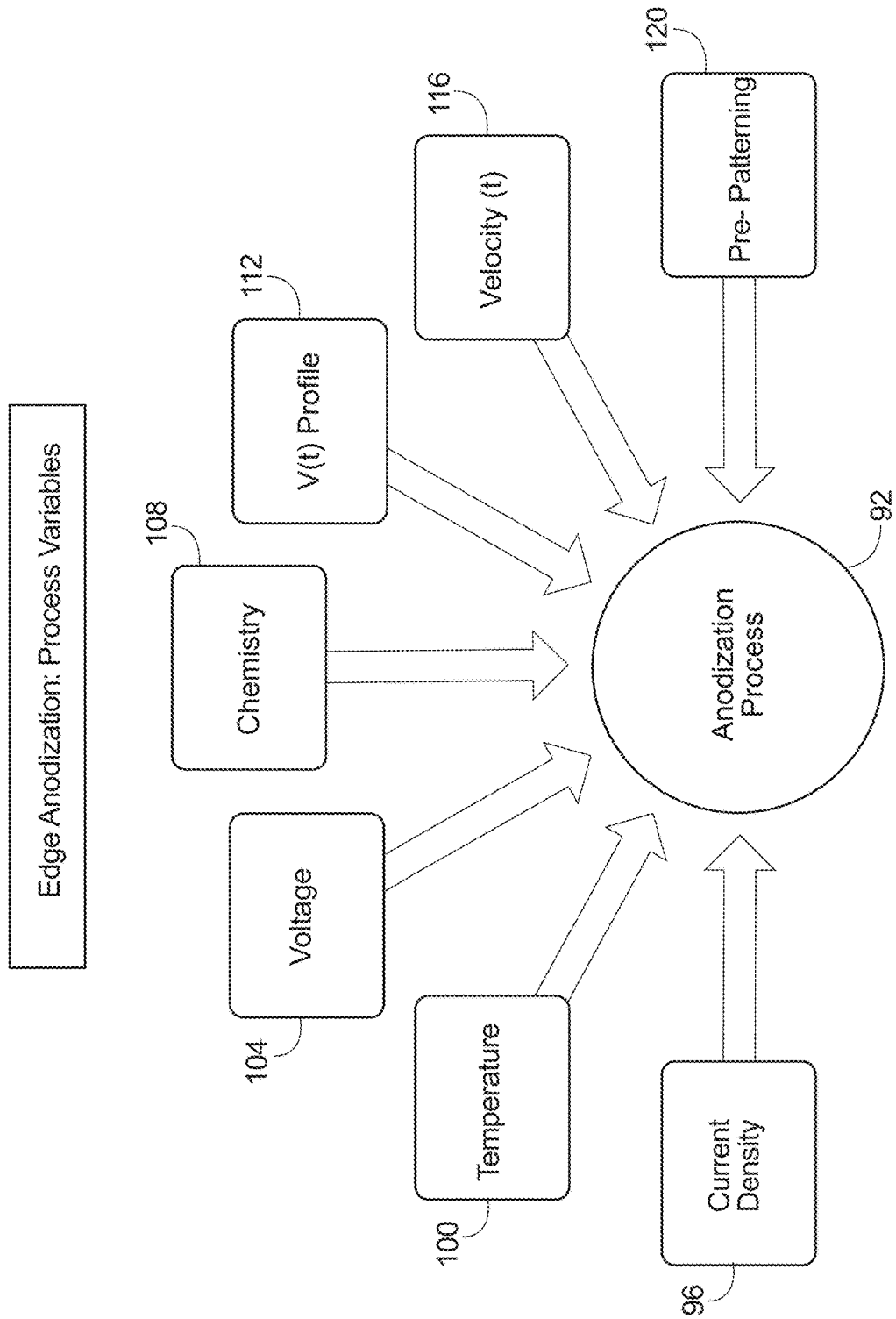
FIG. 28 is a schematic of an edge anodization process variables.

FIG. 28 is a schematic showing the process variables for the disclosed anodization process 92. Current density 96, temperature 100, voltage 104, chemistry 108, V(t) profile 112, velocity (t) 116, and pre-patterning are all process variables to vary the anodization of the aluminum film 76 deposited on the substrate 80 of the workpiece 10.

The anodic film created by the disclosed method has the following tunable properties: film type: [Al, Ti, Mg], Ni, Zr, Zn, (black Fe); "oxidation": O, F, Cl, S, [N,P,C] (liquid, gas, plasma); thickness; scratch resistance; size and density of pores or pillars; hydrophobic or hydrophilic; sealable; additives in pores, such as: sealants, controlled refractive index/haze reduction, chemical functionalization, color, and adhesion.

The disclosed anodic film can provide unprecedented properties to products such as scanner windows, eyeglass lenses, plastic or glass lenses, optical filters, and lcd displays windows.

The disclosed anodic film can provide scratchproof glazing for buildings and vehicles. In addition, the disclosed anodic film can provide scratchproof glazing for plastic windows used in buildings and windows. Thus, plastic windows may be more widely used, when combined with the disclosed anodic film because plastic has 40% density of glass, therefore plastic can be used for larger windows and remain lighter and easily handled as compared to glass windows. The disclosed anodic film can be used to fabricate "unbreakable" materials such as polycarbonates. Plastic windows with the disclosed anodic film have better thermal impedance. In addition, plastic fabricated with the disclosed anodic film can be more easily molded into complex shapes. Plastic has better optical quality than common types of glass, thus combined with the disclosed anodic film, plastic may offer better solutions than glass. The disclosed anodic film may be used on glass to provide for greater scratch resistance.

The optical properties of the disclosed anodic film may be giving by the following:

---

Low Index of Refraction n
Heterogeneous Materials
size < Wavelength
$n_{pore} \sim 1$, $n_{alumina} \sim 1.65$
Parallel $\quad n_{eff} \approx (1 - \emptyset)n_o + n_p$
Series $\quad n_{eff} \approx [(1 - \emptyset)/n_o + \emptyset/n_p]^{-1}$
Drude $\quad n_{eff} \approx [(1 - \emptyset)/n_o^2 + \emptyset/n_p^2]^{1/2}$
$n_o = 1.65$ and $\emptyset = 65\%$ porosity ->
Predict $n_{eff} \approx 1.2$-$1.3$, depending on the model.
Measured: n = 1.24-1.27 with green light. In literature: n = 1.08
Light-pipe/Totally Internally Reflect a core of water

---

The disclosed anodic film may be tuned to have high porosity, and would be suitable for many products. Such products include, but are not limited to:
Optical Fibers with High N.A.→0.9
Power transmission
"Power-Over-Fiber" 10 KW per 10 μm of fiber core diameter
Laser Pumping, Machining, Surgery, Lighting, . . . .
Analytical Instrumentation/automation: Analog Sensors for chemistry, biomedical (pharma biochem libraries), machinery,
Optical Materials/Applications:
pores loaded with transparent, colored or opaque materials, either uniformly, or in patterns to:
 i) reduce haze,
 ii) adjust the index of refraction,
 iii) polarizing effects,
 iv) dichroic filters or bandpasses;
 v) optical gratings;
 vi) small angle optical collimators
 vii) Industrial Sensors
 VIII) Hydrophilic or hydrophobic
Bio/Medical/Chemistry
Lab-on-chip
Combinatorial Micro-Aliquot
Alternate filled pore binary, trinary compound mixing—crush or heat mix.
Microelectronics
Low k dielectric
Z-axis connector—pores filled w/ metal: anisotropic conductor
Image sensor chip color filter
Lithographic Masks
Filters—Highly Uniform with a Narrow Pore Diameter Distribution, ±Few %
 cleaning by refractory ashing;
 cleaning by back-stream cleaning
 Pore Diameters: ~1 μm>D≥10 nm. Highly uniform
 Functionalizable by chemical additives—removal of vapours; addition of vapours. Hydro-phobic/philic
 Porosity as high as ~65% (compare with 1-2% for paper filters)—these could make personal disposable filter masks much easier to breath-through
Ink-Jet Printing "Paper"—Anodic Films on Clear or White Plastic
 Very low ink spreading, ultra-high resolution, high optical dynamic range The disclosed invention can form transparent colorless hardcoating anodic Al films for optical substrates, for optical materials with a tunable index of refraction and scratch resistance. The working piece may be any transparent material substrate (examples include glasses, plastics, crystalline materials) of arbitrary shape and size which has been coated with a film of Aluminum (typically Al 50 nm-100 μm thick—thickness is not required for the invention).

A colorless transparent film may be formed from the Al film by anodization and by additional requirements which may include adjusting film thickness and porosity, pore-filling with transparent colorless materials, and by antireflection coatings when necessary, the film may be referred to as a transparent colorless anodic film.

The Al film may be anodized by a methodical immersion from one side to a far side, in order to completely anodize the Al film to a transparent and colorless highly porous oxide film, remaining as a porous film deposited on the transparent substrate. This may be referred to as controlled edge immersion.

Pore size and areal density of the anodized film may be controlled by the disclosed method. The size and areal fraction of the open pores depends upon the anodizing solution chemistry, temperature, voltage, current density and the speed and speed temporal profile of the controlled immersion. The edge anodizing properties are adjusted depending on the Al film thickness to form pore open area densities between about 0-70%.

The pore size of the anodized film may be adjusted in the disclosed method. The size of the pores can be increased by post process pore-widening processes, as practiced by those skilled in the art, which dissolves the surfaces of the anodized film pores but is stopped before complete dissolution of the anodic alumina film. Pore sizes are preferably several times less than optical wavelengths, or 10-300 nm. Pore open areal density can be adjusted to near 75% of the anodic alumina surface.

The Al and Anodic Al film thickness can be adjusted using the disclosed method. The deposited Al thickness is chosen so that a resulting thickness of porous transparent colorless anodized Al is as necessary for mechanical hardness, complete colorless transparency and index of refraction. Ideally this film is less thick than ½ optical wavelengths, but not essential.

The purity of the anodized film can be controlled by the disclosed process. The film of Al is ideally >99% pure to avoid inclusion in the optical qualities, but may not always be essential depending on the end use. Preferred Al films for clarity: >99.99% purity, and Fe inclusions less than a few ppm.

The refractive index of the anodized film can be tuned using the disclosed process. The index of refraction n of the anodized film is adjusted by addition of transparent materials into the pores with higher or lower or similar indices, as desired. The minimal n is when the pores are open to air. Filling the pores with transparent materials of n>1 raises the index of the heterogeneous film; if materials with n>1.7, the combined index is raised beyond that of the anodic alumina.

The haze and transparency of the anodic film can be controlled with the disclosed method. Optical haze from the film is reduced to that of a clear transparent homogeneous materials by a) anodic film thickness as small as feasible, less than the wavelengths of visible light, and/or b) depositing in the pores transparent materials, such as polymers or glass or others, with the same index of refraction as the anodized Al. The deposition may be by many processes, including doctor-blading (under vacuum), immersion or thermal melts and any others that result in filled or sealed pores, such as CVD or PVD processes.

The primary reflection of the anodic film can be reduced and the transparency of the anodic film can be increased. Reflection between the colorless and transparent anodized film and the transparent substrate is reduced by depositing in the pores a material which raises the effective index of refraction of the porous anodized film to that of the substrate.

The disclosed anodic film can be used as an anti-reflective coating. The index of refraction may be adjusted (typically to ½ that of the workpiece substrate) and thickness (typically ¼ wavelength of incident light) of the anodized film may be adjusted by the fore-mentioned claims to serve as a scratch-resistant antireflection coating for the underlying workpiece.

Using the disclosed method, secondary reflection colorless attributes may be imparted to the anodic film. The boundary between the Al film and the working piece may have intermediate very thin (sub-wavelength) films with intermediate refractive indices to reduce reflective effects which induce interference coloration of the underlying workpiece. These films may be any suitable transparent colorless optical materials, and include polymers, silicones or glasses.

The adhesion characteristics of the anodic film can be adjusted by the disclosed method. Accumulated stress may occur between the anodized Al and the substrate the aluminum film due to the change in dimension of the deposited Al during anodization, and differing thermal expansion between the transparent colorless anodic film and the transparent substrate upon which the anodic film is formed. Thinner anodized Al films have lower accumulated stress; typically, films with thicknesses less than 3 µm on Lucite, polycarbonate and similar polymers, or soda or pyrex-like glass adhere well in sizes tested to 5×5 cm2. In one example, Al patches few mm2 dimension with anode films up to at least 25 µm thick will not produce excessive stress. If stress is induced, the effects of the stress can be reduced or mitigated. The stress is reduced by:

A) Adhesion Pre-processing: i) The Al film may be preprocessed before anodization by patterning to create/define a dense monotonous array small Al film areas as squares, hexagons or other shapes that can tile compactly the entire workpiece, instead of a uniform film, with the patches separated by 0.1 micron or smaller (sub-wavelength) borders for optical performance. These processes include deposition followed by removal of the Al film, or direct patterning on the Al film patches during deposition. These "patches" must be electrically connected in order to have a complete electrical connection to the whole workpiece for methodical immersion into the anodizing fluid to anodize the entire Al on the surface of the workpiece. The electrical connections to patches may be by conducting inks or films (conductive polymers, metal or other) that resist the anodization process but that can be removed post-anodization by thermal or chemical or other post processing. The electrical connections may also be a grid of Al microwires formed by prepatterning, crossing the boundaries of the patches, with the area of wires covering a fraction of the area of the boundary, typically 10%. ii) The workpiece may be preprocessed by a very thin intermediary film that is either elastic or has an intermediate expansion between the underlying workpiece and the Al film on top of it. This step may be combined with the above claims for antireflective and tunable index of refraction.

B) Adhesion Post-processing: i) by filling the pores with clear adhesives to increase adhesion. This step may be combined with the steps to reduce haze, reflection, and eliminate color effects. ii) thermal pressing of the workpiece, with the substrate taken to its softening or glass transition temperatures. For example, polycarbonate typically has a glass transition at 160 C°.

The disclosed method can be used for Fiber Optic application where Total Internal Reflection characteristics must be controlled. The index of refraction of the transparent colorless anodic films may be adjusted to be less than that of typical optic fiber cores made of quartz, glasses, plastics or other optical and/or optically active materials such as used in fiber-based optical amplifiers or lasers. The films may thus serve as the cladding of optical fibers, especially with the lowest available indices, n≤1.1. Similarly, the anodic films may serve generally as cladding on optical parts to increase total internal reflection on optical surfaces, such as in laser amplifiers.

There are 3 models of the effective index of refraction neff for binary heterogeneous materials of different indices of refraction, assuming the sizes of the materials are <<wavelengths of light.

$$\begin{cases} \text{Parallel } n_{\mathit{eff}} \approx (1-\phi)n_o + \phi n_p \\ \text{Series } n_{\mathit{eff}} \approx [(1-\phi)/n_o + \phi/n_p]^{-1} \\ \text{Drude } n_{\mathit{eff}} \approx [(1-\phi)n_o^2 + \phi n_p^2]^{1/2} \end{cases}$$

The porous anodized film with no=1.65 of the anodic aluminum, and np=1 and φ=65% porosity→neff 1.2-1.3, depending on the model. Typical glass or plastic has an index of 1.45-1.68 (the highest index plastic).

The disclosed invention has many advantages. The MIP technique may be of general use when layers of processed material inhibit processing of materials below the processed layer. The processing may be almost any form of energy or chemical/material energy which would be applied to the surface of a work-piece but would be very advantageous to be extended to much thicker surface layers or to the workpiece entirely. The disclosed MIP method has many applications to existing materials surface processing that are low cost, with tunable properties, and easily industrially scalable process for both new products and for added value to many existing products which could utilize, for example, hardness, porosity, optical transparency, low index of refraction, functionizable, or combinations of the aforementioned properties of materials processed using MIP. In general, MIP may be applicable to materials where a materials-process applied to a bulk piece of the material would normally terminate in a surface film or layer leaving the bulk material unprocessed. The MIP process enables complete processing of the bulk material or much thicker films of the processed material on unprocessed bulk material. Other advantages include: 1a. Hard Coating: used as a hard coating process for transparent materials, it preserves the transparency of the underlying material, and if also fabricated as porous with pore diameters less than optical wavelengths can be tuned in index of refraction to match that of the underlying transparent material, or to also serve as an antireflective, reflective or wavelength-selective (dichroic or absorptive filtering) coating in reflection or transmission. 1b. Hard Coating: Generally the process is low cost and can be applied to a wide variety of solid materials—metals, glass, plastics and polymers, ceramics, oxides for examples—i.e. wherever anodizable thin metal films (Al, Mg, Zn, and Ti, primarily) can be deposited either uniformly or as a dense array of patches with electrical connections to the nearest neighbor patches.

2a. Optics: Low index of refraction materials and tunable index of refraction materials due to high and tunable percentages of porosity. 2b: Optics Optical Devices: Optical fibers with high numerical apertures approaching 0.9 by ultra-low index cladding using pores at least 10× smaller than the wavelengths of light and 70% open area, which could transport up to 400% more light than standard commercial fibers. 2c: Optics: Optical Devices: Optical wavelength filter arrays for precision imaging with highly selective colors—the highly anisotropic pores on sub-micron diameters when appropriately patterned with dyes can be used to create 3—or far-more color arrays for filtering image chips with greater fidelity since the dyes are confined to columns which are much thicker than can be applied as a normal filter film to a sensor pixel. Similarly, image reproduction can have high precision when white light is filtered through these dense arrays of pores, either in imaging displays or as printer "paper". 3a. Functionizable coatings due to the high porosity; the pores can be filled with materials that deliver materials or accept materials with specific properties, such as hydro-philic or -phobic, dyes, conductive materials, medicine delivery, precision chemical or medical sampling/aliquots, and other materials to be sampled or delivered, either on specific surfaces or as free-standing porous films or foils. 4a. Manufacturable: Can be applied in roll-to-roll or similar continuous processes on foils (sheets) or filaments (wires), and can be used sequentially in different processing stations to add functional materials or to enhance porosity or to seal pores or other sequential processing steps. 4b: Manufacturable: Can be scaled to process large parts in parallel. 4c: Manufacturable: Amenable to quality control using feedback from sensors to control the process via temperature, speed, energy density, voltage, current, resistance, pH, chemistry makeup, ionization, applied spatial sizes and shapes, optical, thermal and process energy absorption, and their temporal gradients. 5a: Electronics: Very low K and high frequency dielectric films via porous oxides—for insulating transmission lines/interconnects on microcircuits, and 5b: Electronics conversely in porous materials dense arrays of high dielectrics via the spatial anisotropy in the pores but insulated from each other to minimize breakdown and maximize voltage and energy density in capacitors and capacitive electrical energy storage. 5c: Electronics: Free standing films or sheets of highly anisotropic magnetic films for sensors based on moving magnets, or for magnetic-based memory. 5d: Electronics: vias or highly anisotropic conducting films with low resistance perpendicular to the sheet and high resistance in the 2 orthogonal directions lying in the surface of the sheet for connecting circuits in the direction perpendicular to the circuit. 6a: Filters: free-standing filters with up to 70% open area using the standard edge anodization MIP process on Al, or even larger with post-processing pore widening steps, or precision (±2 nm), uniform (±1% or less) pore diameters as fine a few nm via pore coating, that can be cleaned via high temperature ashing and reverse flow. 6b: Filters: that can be made biocompatible, and 6c: Filters that can be coated with materials to deliver to flow stream, such as medicines or other dissolvable materials needed in low concentrations. 6d: Filters: filters with sufficient percentage of open area/ free flow that they could be used long term in human masks without the need for mechanical blower assist, and compact enough to be used as nostril and mouth inserts. The disclosed edge anodization method provides for a low cost, tunable property, easily industrially scalable process for new products and for added value to many existing products which could utilize the hardness, the porosity, or both.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A method of processing of materials using a moving interface, the method comprising:
   providing a working material, the working material comprising a substrate with a metallic film or metal on at least one side of the substrate;
   providing an anodizing bath equipped with a cathode;
   providing a power supply in communication with the cathode, and also in communication with the working material at an anode connection on the working material;
   providing for relative controlled movement between the working material and the anodizing bath, wherein the relative controlled movement is controlled by a motor attached to the working material via a linkage;
   activating the power supply;
   immersing the working material into the anodizing bath;
   upon immersing, completing a circuit between the cathode and the anode connection of the working material;
   also upon immersing, starting anodization of the metallic film or metal at the edge of the metallic film or metal furthest from where the anode connection is located on the working material and below a surface level of the anodizing bath;
   moving the working material at a controlled speed relative to the anodizing bath to control the amount of anodization of the metallic film or metal;
   causing the anodization to move from the metallic film or metal at the edge of the metallic film or metal furthest from where the anode connection is located on the working material up the working material towards the edge nearest the anode connection, resulting in a complete anodization of the metallic film or metal, except for a non-anodized edge where the anode connection is located on the working material, and where the anodized metallic film or metal is transparent and completely porous with no boundary layer.

2. The method of claim 1, wherein the substrate is transparent and the metallic film is an aluminum film.

3. The method of claim 2, wherein the aluminum film is about 10 nm to about 100 nm thick if the substrate does not match the index of refraction of the anodized metallic film, thereby avoiding interference effects and maintaining colorless properties.

4. The method of claim 2, further comprising:
   using an aluminum film that is about 10 nm to about 10 µm thick;
   selecting a porosity, and/or pore termination or non-termination on the substrate, and/or transparent pore filling materials such that the anodized metallic film obtains an index of refraction matching the substrate index of refraction and/or with anti-reflective properties which avoids interference effects and maintains colorless and transparent properties of the anodized metallic film.

5. The method of claim 1, further comprising:
anodizing the metallic film or metal until it is colorless.

6. The method of claim 1, further comprising:
adjusting a temperature of the anodizing bath, a composition of the anodizing bath, voltage, current and/or the controlled speed to form pore open area densities on the anodized metallic film or metal between about 0 to about 70%.

7. The method of claim 1, further comprising:
dissolving a surface of the completely porous anodized metallic film or metal, until a desired pore-widening is achieved.

8. The method of claim 7, wherein the pores sizes are about 10 nm to about 300 nm.

9. The method of claim 2, further comprising:
depositing the aluminum film with a desired thickness on the transparent substrate, so that when the aluminum film is anodized, the aluminum film has the desired mechanical hardness, complete colorless transparency and/or index of refraction.

10. The method of claim 9, wherein the aluminum film thickness is less than about ½ of a desired optical wavelength.

11. The method of claim 1 further comprising;
adjusting the porosity of the anodized metallic film or metal so that the index of refraction of the anodized metallic film or metal is about the same as that of the substrate.

12. The method of claim 2, wherein the aluminum film is greater than 99% pure.

13. The method of claim 2, wherein the aluminum film is greater than 99.99% pure.

14. The method of claim 1, further comprising:
adding transparent material with the desired index of refraction into the anodized metallic film or metal pores in order to achieve the desired refractive index of the anodized metallic film or metal.

15. The method of claim 1, further comprising:
reducing optical haze in the anodized metallic film or metal by depositing in the pores of the anodized metallic film or metal one or more transparent materials with about the same index of refraction as the anodized metallic film or metal.

16. The method of claim 1, further comprising:
depositing in the pores of the anodized metallic film or metal a transparent colorless material which adjusts the effective index of refraction of the anodized metallic film or metal to that of the substrate in order to achieve primary reflection reduction, increased transparency, and increased colorlessness.

17. The method of claim 1, further comprising:
wherein the metallic film or metal comprises a dense monotonous array of small metallic film areas in the shape of squares or hexagons that tiles compactly the entire working material with the small metallic film areas separated from each other by a border with a width of about 0.1 micron to reduce adhesion stress between the anodized metallic film or metal and the substrate.

18. The method of claim 1, further comprising:
applying a buffer layer for reducing stress that may accumulate between the substrate and the anodized metallic film or metal due to a change in area of the anodized metallic film or metal from a metallic film or metal during the anodization.

19. The method of claim 18 wherein the buffer layer is a film that is either elastic or has an intermediate expansion or contraction between substrate and a metal film or metal deposited on top of it.

20. The method of claim 1, further comprising:
reducing adhesion stress between the anodized metallic film or metal and the substrate by filling the pores of the anodized metallic film or metal with clear adhesives to increase adhesion.

21. The method of claim 1, further comprising:
resulting in an anodized metallic film or metal on the working material that has a curved shape.

22. The method of claim 1, further comprising:
resulting in an anodized metallic film or metal on the working material with a cylindrical shape.

23. The method of claim 1, wherein the substrate is transparent and the metallic film is an aluminum film, and the method further comprises:
resulting in a transparent substrate coated with an anodized metallic film that is transparent without requiring mechanical transfer of the transparent anodized metallic film onto a substrate.

24. The method of claim 1, wherein the power supply is preset for constant Voltage, constant Current, or with a time-dependent Voltage and current profile.

* * * * *